United States Patent
Akl et al.

(10) Patent No.: US 12,507,149 B2
(45) Date of Patent: Dec. 23, 2025

(54) BAP CONFIGURATION ASSOCIATED WITH A TOPOLOGY IDENTIFIER

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 790 days.

(21) Appl. No.: 17/451,797

(22) Filed: Oct. 21, 2021

(65) Prior Publication Data
US 2022/0132394 A1    Apr. 28, 2022

Related U.S. Application Data

(60) Provisional application No. 63/104,477, filed on Oct. 22, 2020.

(51) Int. Cl.
*H04W 40/22* (2009.01)
*H04L 45/52* (2022.01)
(Continued)

(52) U.S. Cl.
CPC ............ *H04W 40/22* (2013.01); *H04L 45/52* (2013.01); *H04W 28/0273* (2013.01); *H04W 40/248* (2013.01)

(58) Field of Classification Search
CPC .......... H04W 40/248; H04W 28/0273; H04W 40/34; H04W 40/22; H04W 40/24;
(Continued)

(56) References Cited

U.S. PATENT DOCUMENTS 9,497,639 B2    11/2016   Meshkati et al.
11,558,297 B2 *  1/2023   Tesanovic ............... H04L 47/12
(Continued)

FOREIGN PATENT DOCUMENTS

CN        104205896 A       12/2014
CN        107295460 A       10/2017
(Continued)

OTHER PUBLICATIONS

Huawei, et al., "BAP and RLC Configurations", 3GPP Draft, 3GPP TSG-RAN WG2 meeting #107bis, R2-1912375, BAP and RLC Configurations, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019 Oct. 4, 2019 (Oct. 4, 2019), XP051790420, 7 Pages, Retrieved from the Internet: URL: http://www.3gpp.org/ftp/tsg_ran/WG2_RL2/TSGR2_107bis/Docs/R2-1912375.zip [Retrieved on Oct. 4, 2019] .
(Continued)

*Primary Examiner* — Kibrom T Hailu
(74) *Attorney, Agent, or Firm* — Procopio, Cory, Hargreaves & Savitch LLP

(57) ABSTRACT

A second network node determines a backhaul adaptation protocol (BAP) configuration associated with a backhaul traffic transport and including a topology identifier corresponding to a topology of a plurality of topologies for which traffic associated with the topology is transported based on the BAP configuration. The second network node sends, to a first network node, the BAP configuration associated with
(Continued)

the backhaul traffic transport. The first network node receives a first BAP configuration associated with a first topology identifier (ID) corresponding to a first topology, and a second BAP configuration associated with a second topology ID corresponding to a second topology that overlaps at least in part with the first topology. The first network node determines with which traffic is associated routes traffic associated with the first topology ID based on the first BAP configuration, and traffic associated with the second topology ID based on the second BAP configuration.

31 Claims, 16 Drawing Sheets

(51) Int. Cl.
*H04W 28/02* (2009.01)
*H04W 40/24* (2009.01)

(58) Field of Classification Search
CPC ......... H04L 45/02; H04L 45/52; H04L 45/28; H04L 45/74
See application file for complete search history.

(56) References Cited

U.S. PATENT DOCUMENTS

| | | | |
|---|---|---|---|
| 2020/0221329 A1* | 7/2020 | Kim | H04W 12/037 |
| 2020/0245223 A1 | 7/2020 | Cheng et al. | |
| 2021/0058826 A1* | 2/2021 | Mao | H04W 28/088 |
| 2021/0119920 A1* | 4/2021 | Tesanovic | H04W 28/0278 |
| 2022/0166703 A1* | 5/2022 | Xu | H04L 61/50 |
| 2022/0217613 A1* | 7/2022 | Teyeb | H04L 47/125 |
| 2023/0036769 A1* | 2/2023 | Wu | H04W 40/22 |
| 2023/0284246 A1* | 9/2023 | Xu | H04W 72/51 455/509 |

FOREIGN PATENT DOCUMENTS

| | | |
|---|---|---|
| CN | 111093211 A | 5/2020 |
| WO | 2013134435 A1 | 9/2013 |

OTHER PUBLICATIONS

International Search Report and Written Opinion—PCT/US2021/056255—ISA/EPO—Feb. 23, 2022.

Nokia, et al., "Routing and Mapping Configuration in IAB Nodes", 3GPP Draft, 3GPP TSG-RAN WG2 Meeting #107bis, R2-1913462, Routing and Mapping Configuration in IAB Nodes, 3rd Generation Partnership Project (3GPP), Mobile Competence Centre, 650, Route Des Lucioles, F-06921 Sophia-Antipolis Cedex, vol. RAN WG2, No. Chongqing, China, Oct. 14, 2019-Oct. 18, 2019, Oct. 4, 2019 (Oct. 4, 2019), XP051805005, 4 Pages, Retrieved from the Internet: URL: https://ftp.3gpp.org/tsg_ran/WG2_RL2/TSGR2_107bis/Docs/R2-1913462.zip [retrieved on Oct. 4, 2019].

Qualcomm: "CR to 38.300 on Integrated Access and Backhaul for NR", Draft, 3GPP TSG-RAN WG2 Meeting #108, 3rd Generation Partnership Project (3GPP), Mobile Competence Centre, 650, Route Des Lucioles, F-06921 Sophia-Antipolis Cedex, France, vol. RAN WG2, Nov. 18, 2019-Nov. 22, 2019, Dec. 16, 2019, 28 Pages, URL: https://ftp.3gpp.org/Email_Discussions/RAN2/%5BRAN2%23108%5D/%5B108%2310%5D%5BIAB%5D%20Running%20CR%2038300/draft%20R2-19xxxxx%20IAB%20running%20CR%20for%2038300%20v3.docx [Retrieved on Dec. 16, 2019].

Qualcomm: "CR to 38.300 on Integrated Access and Backhaul for NR", [Online] Dec. 19, 2019 (Dec. 19, 2019), 3GPP Draft, 3GPP TSG-RAN WG2 Meeting #108, R2-1916641, 3rd Generation Partnership Project (3GPP), Mobile Competence Centre, 650, Route Des Lucioles, F-06921 Sophia-Antipolis Cedex, France, XP051839542, 28 Pages, Abstract, Figure 4. x .2 .3 Paragraphs [0004], [4.x.3].

Qualcomm Incorporated: "[R2#107bis-offline-31] IAB routing and bearer mapping config", 3GPP TSG-RAN WG2 Meeting #107bis, R2-1914186, Chongqing, China, Oct. 14-18, 2019, 11 Pages.

* cited by examiner

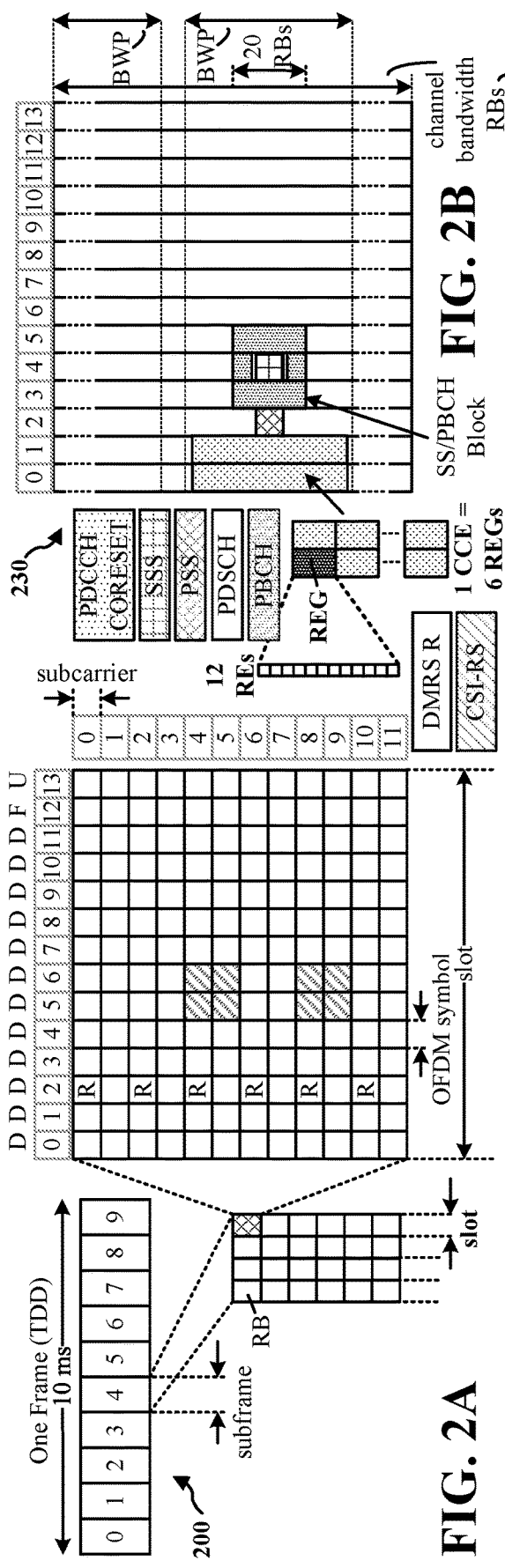
FIG. 2A
FIG. 2B
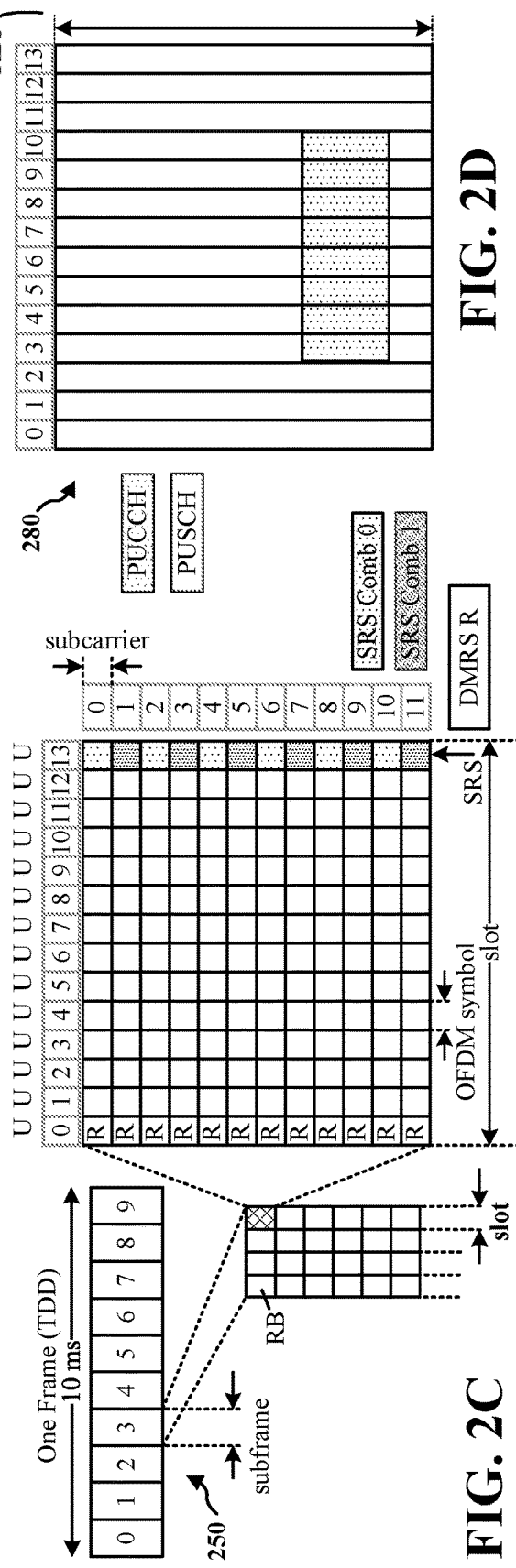
FIG. 2C
FIG. 2D

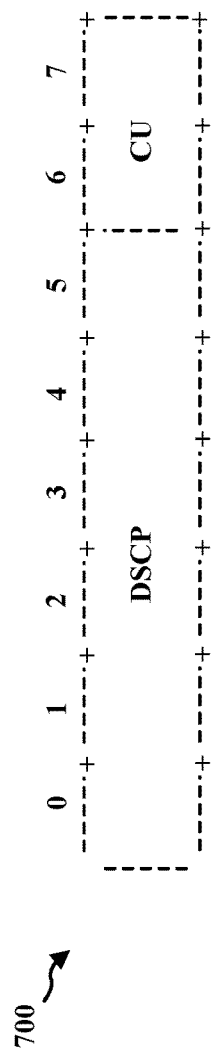
FIG. 7A
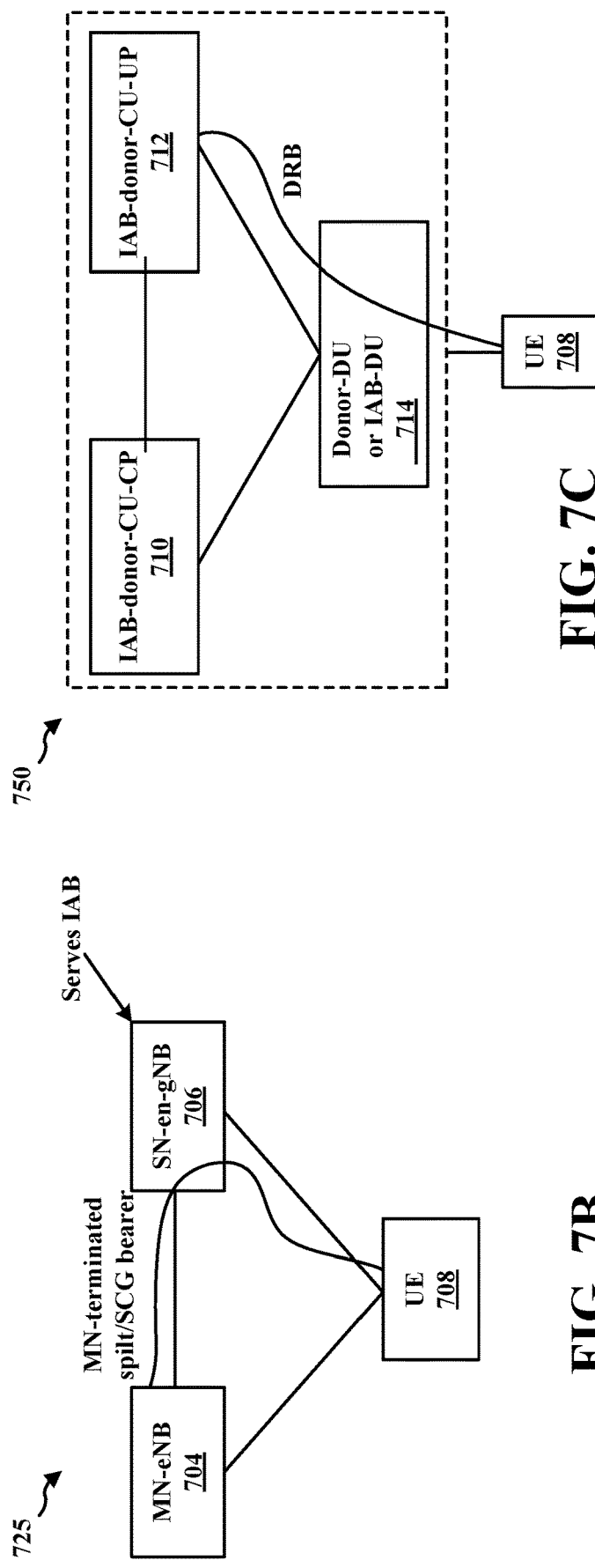
FIG. 7C
FIG. 7B

BAP CONFIGURATION ASSOCIATED WITH A TOPOLOGY IDENTIFIER

CROSS REFERENCE TO RELATED APPLICATION(S)

This application claims the benefit of and priority to U.S. Provisional Application Ser. No. 63/104,477, entitled "BAP Configuration Including Associated With a Topology Identifier" and filed on Oct. 22, 2020, which is expressly incorporated by reference herein in its entirety.

TECHNICAL FIELD

The present disclosure relates generally to communication systems, and more particularly, to wireless communication in an integrated access and backhaul (IAB) network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may comprise a first network node. The apparatus receives a first backhaul adaptation protocol (BAP) configuration associated with a first topology, and a second BAP configuration associated with a second topology that overlaps at least in part with the first topology. The apparatus routes traffic associated with the first topology based on the first BAP configuration, and traffic associated with the second topology based on the second BAP configuration.

In an aspect of the disclosure, a method, a computer-readable medium, and an apparatus are provided. The apparatus may comprise a first network node. The apparatus receives a first BAP configuration associated with a first topology identifier (ID) corresponding to a first topology, and a second BAP configuration associated with a second topology ID corresponding to a second topology that overlaps at least in part with the first topology. The apparatus determines whether traffic is associated with the first topology ID or the second topology ID and routes traffic associated with the first topology ID based on the first BAP configuration, and traffic associated with the second topology ID based on the second BAP configuration.

In an aspect of the disclosure, a method, a computer-readable medium, and an apparatus are provided. The apparatus may comprise a second network node. The apparatus determines a BAP configuration associated with a backhaul traffic transport, the BAP configuration including a topology identifier corresponding to a topology of a plurality of topologies for which traffic associated with the topology is transported based on the BAP configuration. The apparatus sends, to a first network node, the BAP configuration associated with the backhaul traffic transport.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 7A illustrates an example of header information for differentiated service.

FIG. 7B illustrates an example of a UE having a connection with a primary node and a secondary node.

FIG. 7C illustrates example components and an IAB donor node.

DETAILED DESCRIPTION

Figure 1:
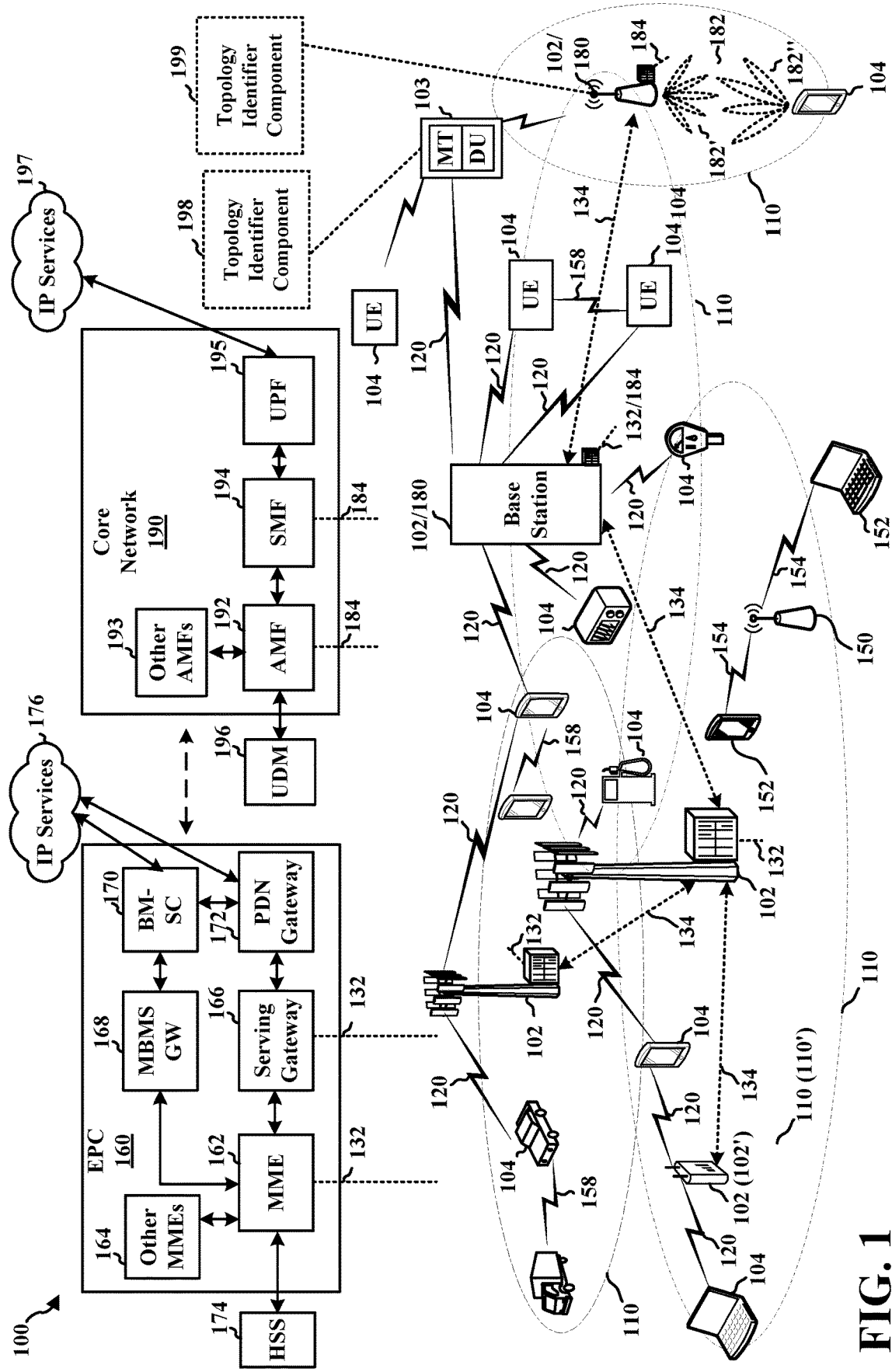
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

In some examples, the IAB node 103 may include a topology identifier component 198 that is configured to receive a first BAP configuration associated with a first topology corresponding to a first topology, and a second BAP configuration associated with a second topology corresponding to a second topology that overlaps at least in part with the first topology. The topology identifier component 198 of the IAB node 103 may be configured to determine whether traffic is associated with the first topology or the second topology and to route traffic associated with the first topology based on the first BAP configuration, and traffic associated with the second topology based on the second BAP configuration. An IAB donor CU, e.g., base station 102 or 180 or other IAB node, may include a topology identifier component 199 that is configured to determine a BAP configuration associated with a backhaul traffic transport, the BAP configuration including a topology identifier corresponding to a topology of a plurality of topologies for which traffic associated with the topology is transported based on the BAP configuration. The topology identifier component 199 may be further configured to send, to a first network node, the BAP configuration associated with the backhaul traffic transport.

Although aspects of the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
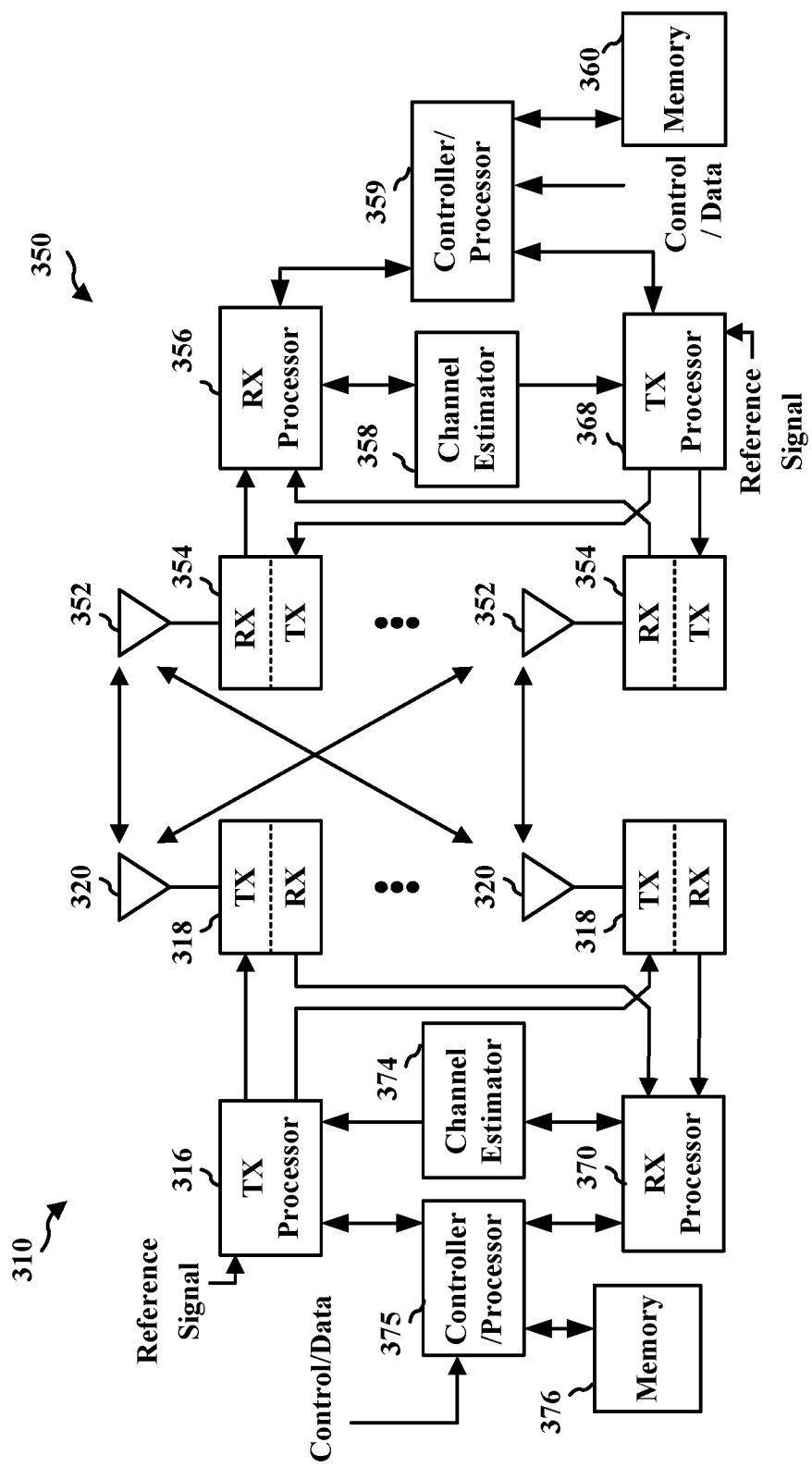
FIG. 3 is a diagram illustrating an example of a first wireless device and a second wireless device in an access network.

FIG. 3 is a block diagram of a first wireless device in communication with a second wireless device. For example, the first wireless device 310 may be a base station in communication with a UE (e.g., wireless device 350) in an access network. In some examples, the first wireless device 310 may be an IAB node in communication with a UE (e.g., wireless device 350). In other examples, the first device may be a parent IAB node (e.g., an IAB node DU) and the second wireless device may be a child IAB node (e.g., an IAB node MT). In some examples, the first wireless device may be an IAB donor, and the second wireless device may be an IAB node. In some examples, the first wireless device may be an IAB donor, and the second wireless device may be an IAB donor.

Although the aspects in FIG. 3 are described in connection with a base station and a UE, the concepts are applicable to communication between other wireless devices. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate an a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the wireless device 310. These soft decisions may be based on channel estimates computed by the channel estimator 358. The soft decisions are then decoded and deinterleaved to recover the data and control signals that were originally transmitted by the wireless device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the wireless device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the wireless device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the wireless device 310 in a manner similar to that described in connection with the receiver function at the device 350. Each receiver 318RX receives a signal through its respective antenna 320. Each receiver 318RX recovers information modulated onto an RF carrier and provides the information to a RX processor 370. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the topology identifier component 198 of FIG. 1.

At least one of the TX processor 316, the RX processor 370, and the controller/processor 375 may be configured to perform aspects in connection with the topology identifier component 199 of FIG. 1.

Figure 4:
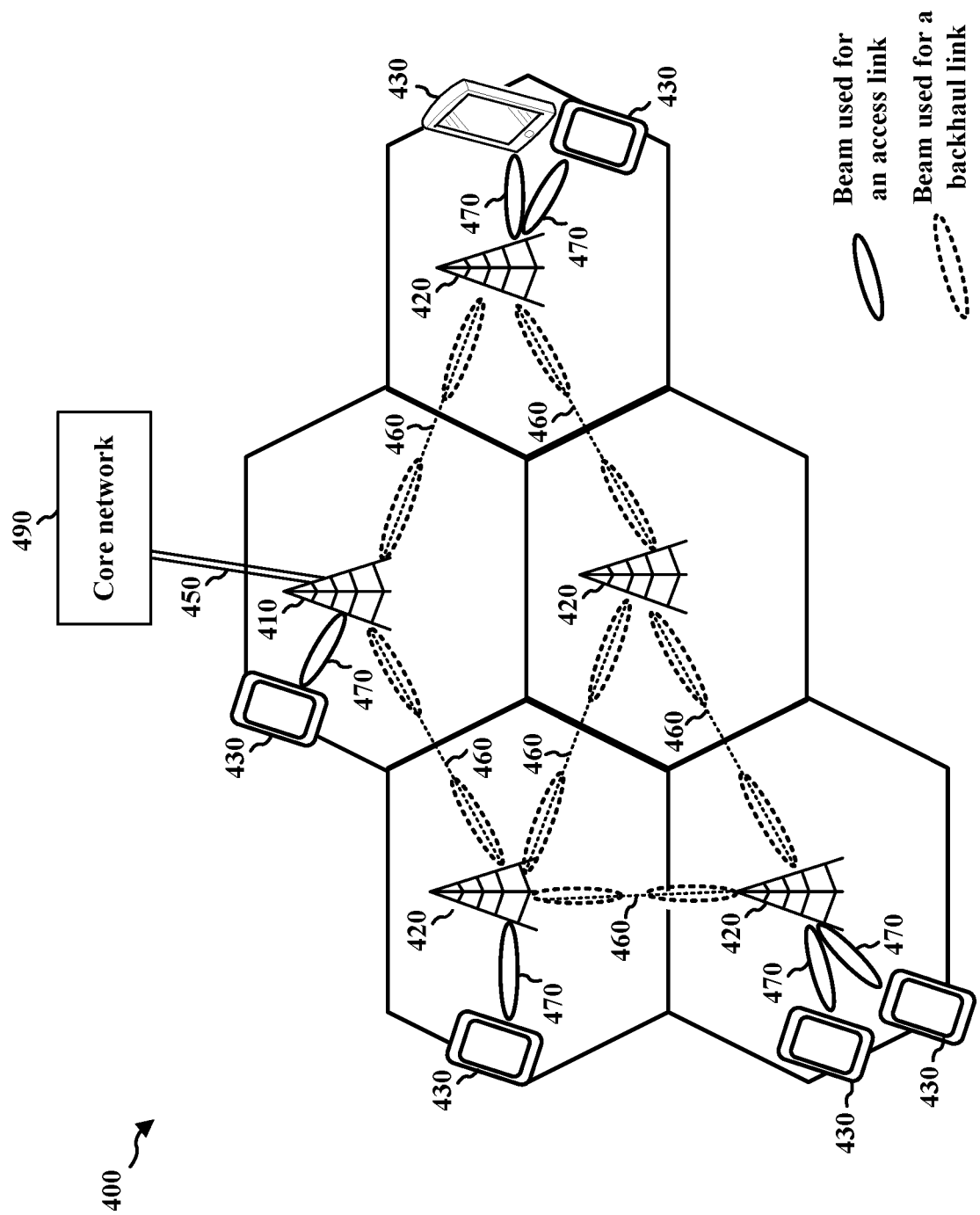
FIG. 4 is a diagram illustrating an example IAB network.

FIG. 4 is a diagram illustrating an IAB network 400. The IAB network provides access network functionality between access nodes (ANs) 420 and other ANs/UEs, and backhaul network functionality between ANs 420. The ANs 420 include IAB-donors, which may have a wireline connection to the core network, and IAB-nodes, which operate wirelessly and relay traffic to/from IAB-donors through one or more AN hops. The IAB ANs 420 share resources between the access links and the backhaul links. That is, the resources (e.g., in time and frequency) that are used for access communication between the AN(s) 420 and other AN(s) 420 and/or between AN(s) 420 and UE(s) 430 may also be used for backhaul communication between the AN(s).

The IAB network 400 may include an anchor node (that may be referred to herein as an "IAB donor") 410 and access nodes (that may be referred to herein as "IAB nodes") 420. The IAB donor 410 may be a base station (e.g., 102 or 180 in FIG. 1) and may perform functions to control the IAB network 400. In some aspects, the IAB donor 410 may be an eNB or a gNB. The IAB nodes 420 may comprise L2 relay nodes, etc. Together, the IAB donor 410 and the IAB nodes 420 share resources to provide an access network and a backhaul network to core network 490. For example, resources may be shared between access links and backhaul links in the IAB network.

The UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. UEs 430 communicate with the core network by relaying messages through their respective access link 470 to the IAB network 400, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for that IAB donor 410 or IAB node 420. The PCI value may be used to determine a scrambling sequence that is applied to physical signals and/or channels that are transmitted by a particular IAB node. For example, a PSS and/or the SSS transmitted by the respective IAB donor 410 or IAB node 420 may be scrambled using a scrambling sequence that is based on the PCI used by the respective IAB node.

Figure 5:
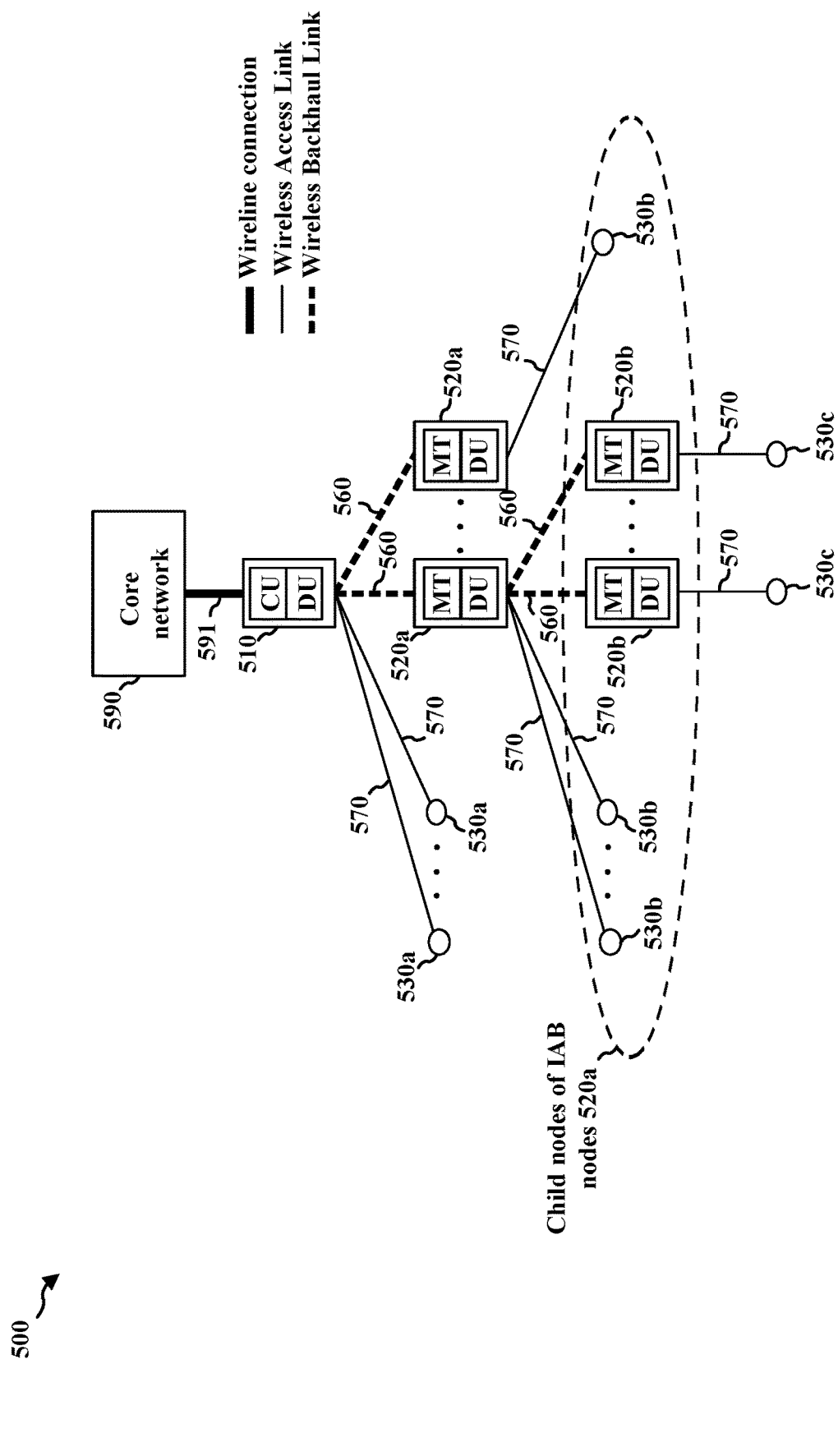
FIG. 5 is a diagram illustrating an example IAB network and components thereof.

FIG. 5 illustrates a second diagram illustrating an IAB network 500 and components thereof. The IAB network 500 includes an IAB donor 510 and IAB nodes 520a and 520b. The IAB nodes, as well as the IAB donor, may provide wireless access links to UEs 530a, 530b, 530c.

The IAB donor 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, the IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may control the IAB network 500 through configuration. The CU may perform RRC/PDCP layer functions. The IAB donors 510 further include a DU that performs scheduling. For example, the DU may schedule resources for communication by the child IAB nodes 520a and/or UEs 530a of the IAB donor 510. The DU holds radio link control (RLC), media access control (MAC), a physical (PHY) layer functions.

The IAB nodes 520a, 520b may include a mobile termination (MT) and a DU. The IAB node is an L2 relay node. The MT of IAB node 520a may operate as a scheduled node, scheduled similar to a UE 530*a* by the DU of the parent node, e.g., IAB donor 510. The MT of IAB node 520*b* may operate as a scheduled node of parent node 520*a*. The DU may schedule the child IAB nodes 520*b* and UEs 530*b* of the IAB node 520*a*. An IAB node may provide a connection to an IAB node that in turn provides a connection for another IAB node. The pattern of a parent IAB node comprising a DU that schedules a child IAB node/child UE may continue to more connections than the connections illustrated in FIG. 5.

Figure 6:
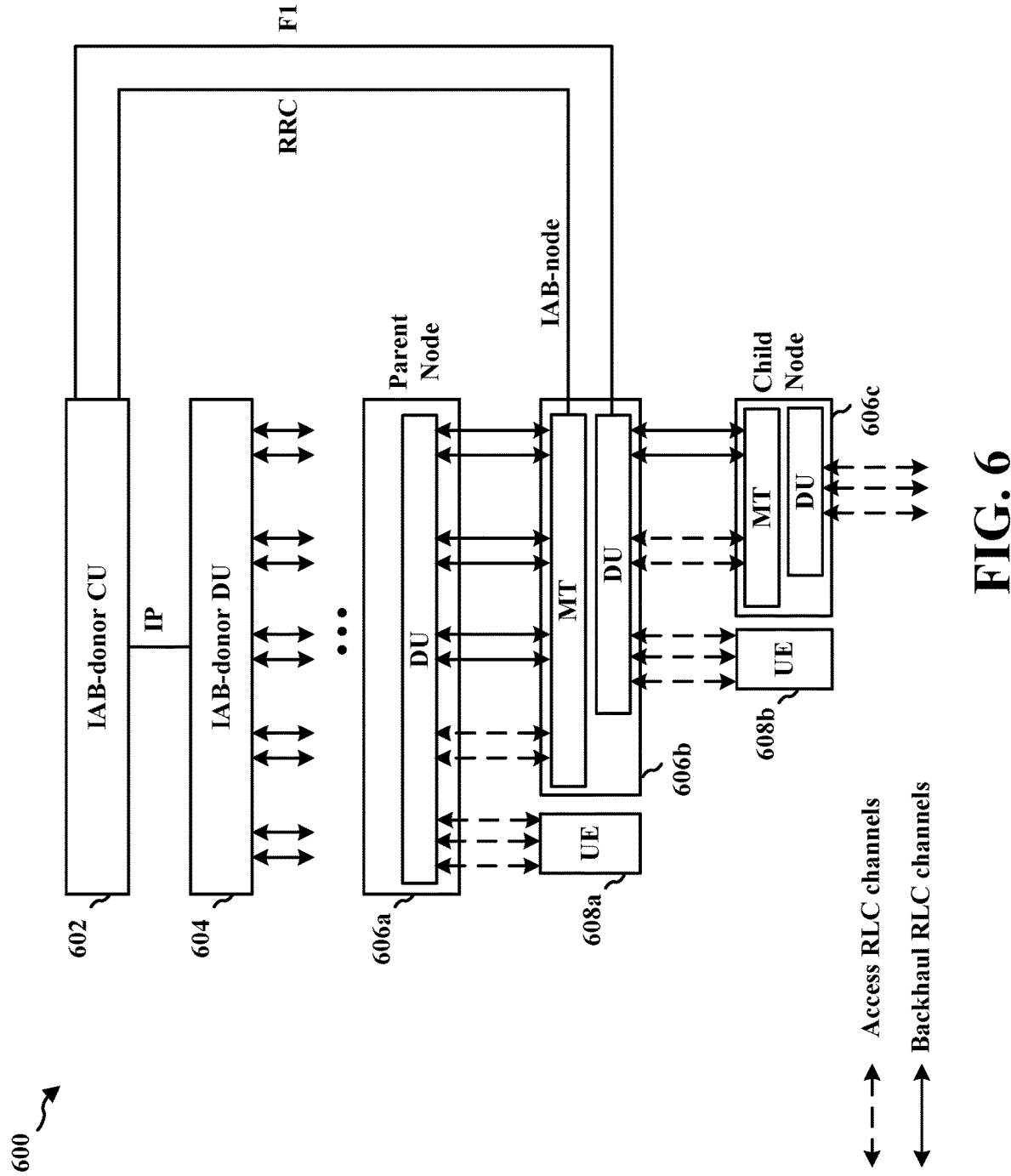
FIG. 6 is a diagram illustrating example connections for an IAB network.

FIG. 6 is a diagram 600 illustrating RLC channels in an IAB network. As discussed in connection with FIGS. 4 and 5 the IAB network provides both access network functionality and backhaul network functionality. The IAB network includes an IAB donor with a CU 602 and DU 604. For the access network functionality, the IAB ANs 606*a*, 606*b*, and 606*c* may communicate with other UEs 608*a* and 608*b* and/or MTs of other IAB ANs through access RLC channels. For the backhaul network functionality, the IAB ANs 606*a*, 606*b*, and 606*c* may route traffic to other ANs (e.g., 606*a*, 606*b*, and 606*c*) through backhaul RLC channels. Access RLC channels may include UE-to-DU/DU-to-UE, carrying PDCP for RRC or data radio bearers (DRBs), and MT-to-DU/DU-to-MT, carrying PDCP for RRC (or DRBs). Backhaul RLC channels may include MT-to-DU/DU-to-MT, carrying backhaul adaptation protocol (BAP) messages for backhauling access traffic.

Differentiated services may provide a framework and building blocks to enable deployment of scalable service discrimination on the Internet. In the packet forwarding path, differentiated services (DS) may be realized by mapping the differentiated services codepoint (DSCP) contained in a field in the Internet protocol (IP) packet header (e.g., including the fields illustrated in the example header information 700 in FIG. 7A) to a particular forwarding treatment, or per-hop behavior (PHB), at each AN along its path. Six bits of the DS field are used as the DSCP to select the PHB that a packet experiences at each node. The two-bit CU field may be reserved. The DSCP field may be defined as an unstructured field to facilitate the definition of future per-hop behaviors. The mapping of DSCPs to PHBs may be configurable. A DS-compliant node may support the logical equivalent of a configurable mapping table from DSCPs to PHBs.

An IP flow label field (referred to herein as IP flow label) may include a 20-bit flow label field in the IP header (e.g., an IPv6 header) that is used by an AN to label packets of a flow. From the viewpoint of the network layer, a flow is a sequence of packets sent from a particular source to a particular unicast, anycast, or multicast destination that an AN intends to label as a flow. An example definition of a flow for this purpose may be any set of packets carrying the same 5-tuple of {destination address, source address, protocol, destination port, source port}. There are cases in which the complete 5-tuple for all packets is not readily available to a forwarding AN, in particular for fragmented packets. In such cases, a flow can be defined by fewer IP header fields, typically using only the 2-tuple {destination address, source address}. The usage of the 3-tuple of the flow label, source address, and destination address fields enables efficient IP flow classification, where only IPv6 main header fields in fixed positions are used. Packets may be processed in a flow-specific manner. To enable flow-label-based classification, source nodes may assign each unrelated transport connection and application data stream to a new flow.

As illustrated in the example 725 in FIG. 7B, a UE 708 may be dual connected to a master node (MN) eNB 704 and a secondary gNB (an IAB-donor) 708 that manages IAB. For each requested E-UTRAN radio access bearer (E-RAB) configured as MN terminated split bearer/secondary cell group (SCG) bearer, if the QoS mapping information element (IE) is contained in the general packet radio service (GPRS) tunnelling protocol (GTP) tunnel endpoint IE in the secondary gNB (SgNB) additional/modification request acknowledge message, the master eNB (MeNB) 704 (also referred to as MN-eNB) shall, if supported, use the IE to set the DSCP and/or flow label fields for the downlink IP packets which are transmitted from the MeNB to a secondary node (SN) enhanced gNB (SN-en-gNB) 706 (serving the IAB) through the GTP tunnels indicated by the GTP tunnel endpoint IE. The SN donor 706 configures a mapping of the received packets from the MN-eNB 704 based on the IP header fields to a route via the IAB backhaul transport.

For each requested DRB, if the QoS mapping information IE is contained in the DL user plane (UP) parameters IE in the bearer contact setup/modification request message, the gNB CU for UP (gNB-CU-UP) shall use the IE to set the DSCP and/or flow label fields in the downlink IP packets that are transmitted through the GTP tunnels indicated by the UP transport layer information IE. A downlink mapping is configured at IAB-donor-DU based on the IP header fields to a BAP route and egress backhaul RLC channel.

A UE 708 may be connected to an IAB-network. FIG. 7C illustrates an example 750 of a UE 708 connected in an IAB-network. The IAB-donor may setup a DRB for the UE. The DRB flows between the IAB-donor-CU and the UE. In some aspects, the IAB-donor-CU may configure a downlink mapping at a donor-DU as previously described. In some aspects, the IAB-donor-CU may configure IP header fields with DSCP/IPv6 flow labels and may send packets to the donor-DU as previously described. In some aspects, the IAB-donor-CU may include the CU-CP 710 and one or more CU-UPs 712, as shown in FIG. 7C. In such aspects, a DRB flow between a CU-UP and the UE may be configured as previously described. The CU-CP may perform bearer setup per DRB at a CU-UP. The CU-CP may configure QoS mapping info at the CU-UP for each requested DRB as previously described. The CU-UP may also configure the IP header fields based on the QoS mapping info as previously described. The downlink mapping may be configured by the CU-CP at the donor-DU as previously described.

The IAB-donor CU may include an IAB-donor CU for the control plane (CP) (IAB-donor-CU-CP) 710 and one or more IAB-donor CUs for the user plane (UP) (IAB-donor-CU-UPs) 712. A DRB flows between an IAB-donor-CU-UP through an IAB-donor-DU or IAB-DU 714 to/from a UE 708. The IAB-donor-CU-UP 712 inserts within an IP packet QoS mapping information, which includes the DSCP and the IP flow label. Based on the QoS mapping information, the IAB-donor-CU-CP 710 configures a routing path for the IAB-donor-DU, so when the IAB-donor-DU receives an IP packet, the IAB-donor-DU decides how to route the traffic.

Figure 8:
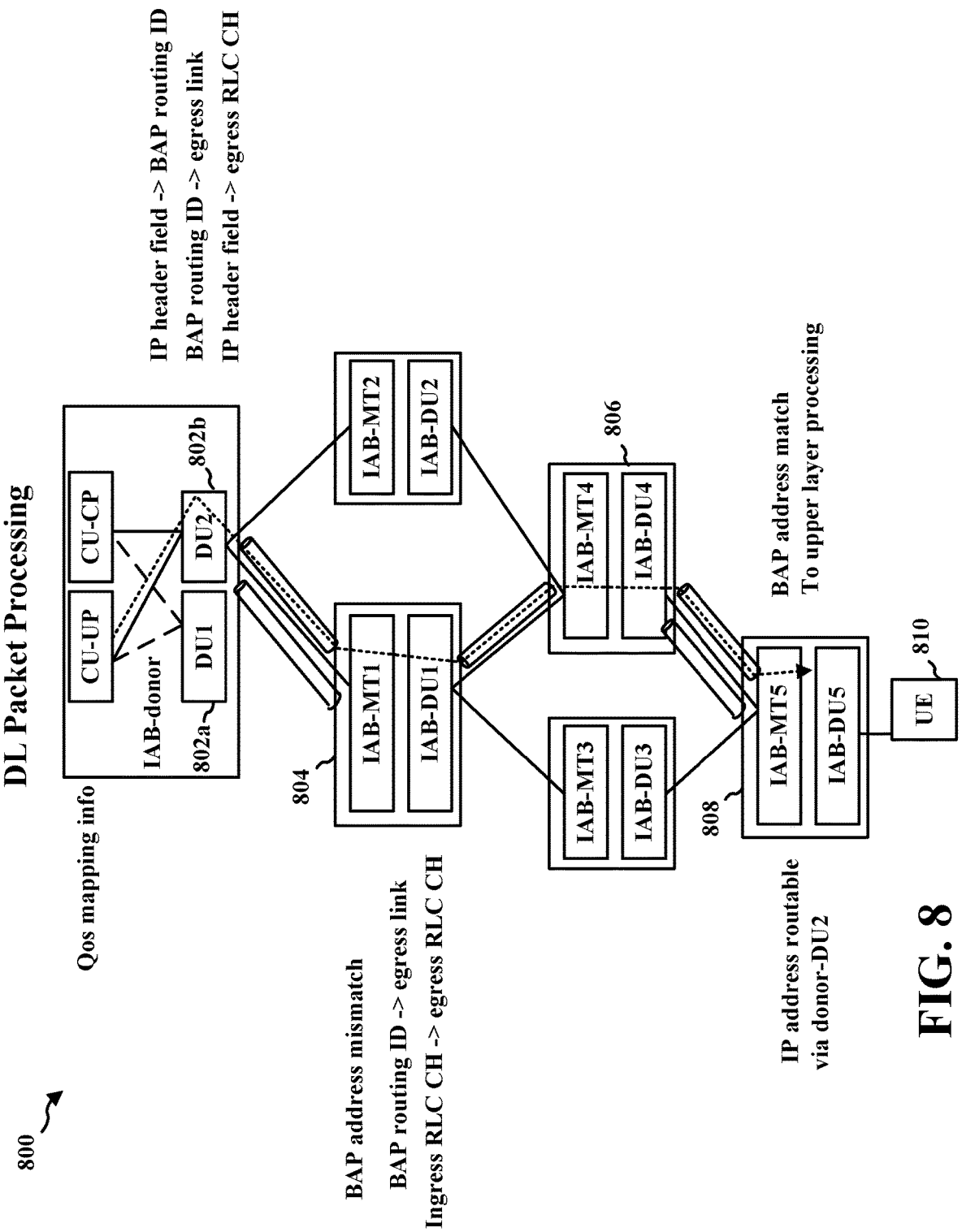
FIG. 8 illustrates an example of downlink packet processing in an IAB network.

FIG. 8 is a diagram 800 illustrating an IP/BAP configuration for downlink packet processing. As discussed supra, the IAB-donor-CU (e.g., IAB-donor-CU-UP) (e.g., IAB donor 1 802*a* or IAB donor 2 802*b*) inserts within an IP packet QoS mapping information, which includes the DSCP and the IP flow label. Based on the QoS mapping information, the IAB-donor-CU (e.g., IAB-donor-CU-CP) configures a routing path for a downlink mapping at the IAB-donor-DU. When the IAB-donor-DU receives an IP packet, the IAB-donor-DU may then decide how to route the traffic based on the IP header and the downlink mapping configuration. The downlink mapping configuration indicates a mapping between the IP header fields (destination IP address, DCSP, and/or IPv6 flow label) and a BAP routing ID. The IAB-donor-DU inserts a BAP header to the packet that carries the BAP routing ID. The IAP-donor-DU further determines an egress link to which to forward the IP packet. For example, the IAP-donor-DU further determines, based on a routing configuration, a mapping between the BAP routing ID and an egress link along which the IAB-donor-DU forwards the BAP packet. The IAB-donor-DU transmits the BAP packet to the IAB-node 1 804. The IAB-node 1 804 determines that the BAP address, which may be part of the BAP routing ID and carried in the BAP header, does not match its own BAP address (i.e., there is a BAP address mismatch), and based on the BAP routing ID and a routing configuration, determines the egress link for transmitting the BAP packet. Based on the ingress RLC channel and a channel mapping configuration, the IAB-node 1 804 determines the egress RLC channel. The IAB-node 1 804 then transmits the IP packet through the determined link and the egress RLC channel to the IAB-node 4 806. The same process is followed for IAB-node 4 806 and IAB-node 5 808, where IAB-node 5 808 determines a BAP address match, removes the BAP header, and forwards the IP packet to upper layer processing for transmission to a UE 810.

Figure 9:
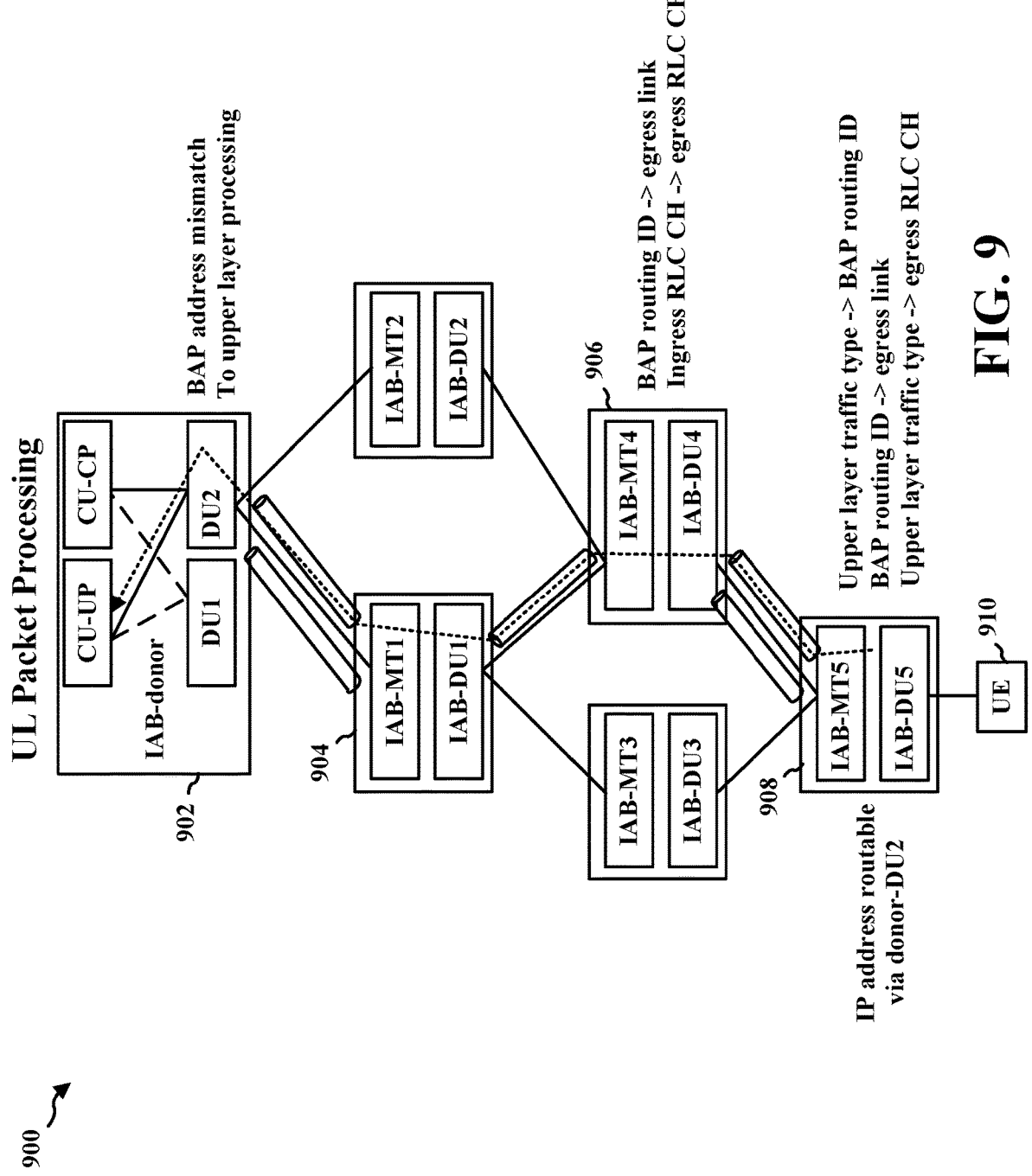
FIG. 9 illustrates an example of uplink packet processing in an IAB network.

FIG. 9 is a diagram 900 illustrating an IP/BAP configuration for uplink packet processing. For UL traffic, based on the traffic type and an uplink mapping configuration, the IAB-node 5 908 determines a BAP routing ID for an uplink packet from the UE 910, and inserts the BAP routing ID into the BAP header for the UL packet. Based on the BAP routing ID and a routing configuration, the IAB-node 5 908 determines an egress link, and based on the traffic type, determines an egress RLC channel. The IAB-node 5 908 transmits the IP packet to the IAB-node 4 906 based on the determined egress link and egress RLC channel. The IAB-node 4 906 determines, based on the BAP routing ID and a routing configuration, the egress link. The IAB node 4 906 determines, based on the ingress RLC channel and a channel mapping configuration, the egress RLC channel. The IAB-node 4 906 transmits the BAP packet to the IAB-node 1 904 based on the determined egress link and egress RLC channel. The same process is followed by IAB-node 1 904, and the IP packet is ultimately received and processed by the IAB-donor 902 where there is a BAP address match.

Figure 10A:
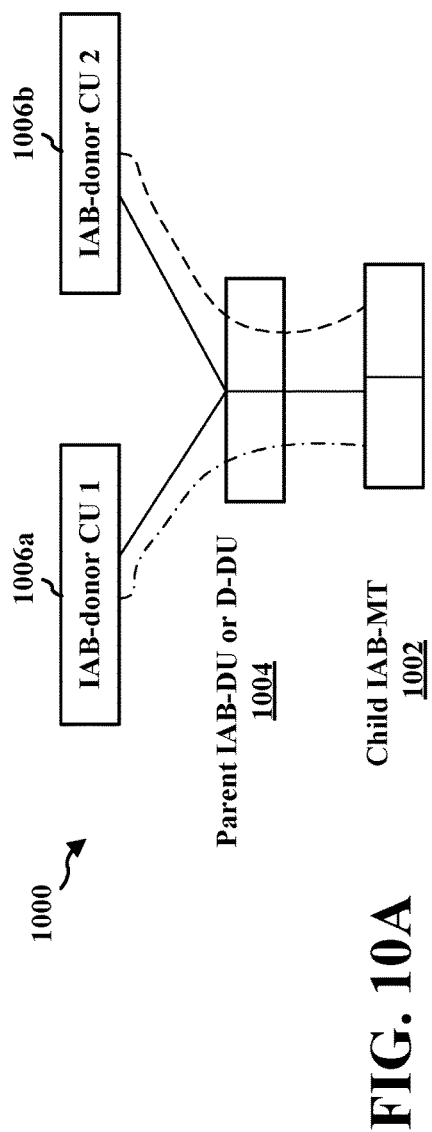
FIG. 10A illustrates an example IAB network in which an IAB node has a dual connection to multiple IAB donor nodes.
Figure 10B:
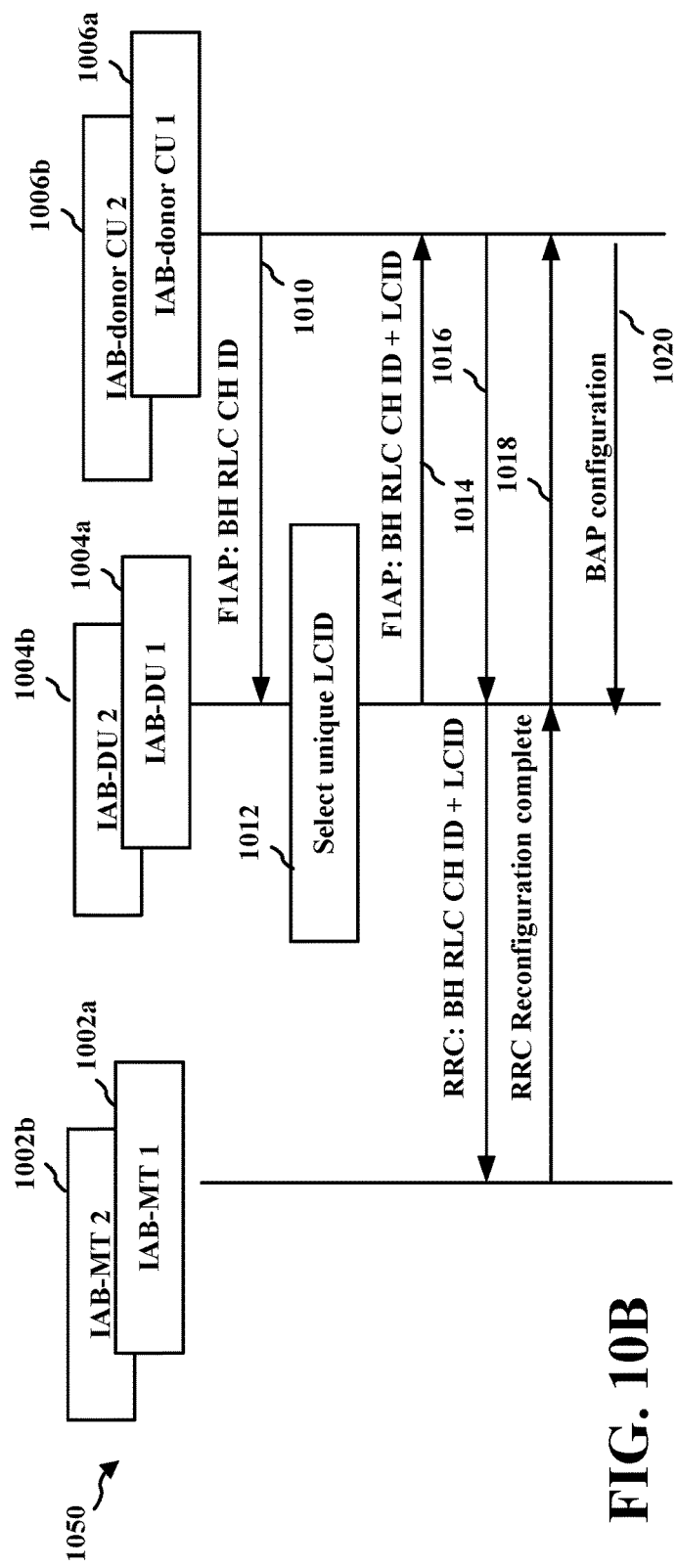
FIG. 10B illustrates an example communication flow for the dual connection described in connection with FIG. 10A.

FIG. 10A illustrates a network diagram 1000 showing IAB-donor CU 1 1006a and IAB-donor CU 2 1006 each having a connection to parent IAB-DU or donor-DU 1004 and which is connected to child IAB node-MT 1002. Thus, the parent IAB-node 1004 (whether an IAB node or IAB-donor-DU) and child IAB node (e.g., node-MT 1002) may have a dual connection to the IAB donor CU 1 1006a and IAB donor CU 2 1006b. FIG. 10B illustrates an example communication flow 1050 for providing a BAP configuration between the IAB donor CUs 1 and 2 (e.g., 1006a and 1006b) and IAB-DU 1 1004a and IAB-DU 2 1004b for communication directed to IAB-MT 1 1002a and IAB-MT 1002b, respectively. The IAB-donor-CU1 1006a may send a request to IAB-DU1 1004a to configure a backhaul (BH) RLC channel between IAB-DU1 1004a and IAB-MT1 1002a. The IAB-donor-CU1 1006a may indicate a BH RLC CH ID 1010 for the BH RLC CH. The IAB-DU1 1004a may configure the BH RLC CH and select a corresponding unique LCID at 1012. The IAB-DU1 1004a may send a response at 1014 indicating the BH RLC CH ID and the LCID of the configured channel to CU1 1006a.

The IAB-donor-CU1 1006a may further send an RRC message 1016 to configure the other end of the BH RLC CH at IAB-MT 1002a. The IAB-donor-CU1 1006a may include both the BH RLC CH ID and the LCID of the CH to be configured in the RRC message.

The IAB-MT 1002a responds to the IAB donor CU 1 1006a indicating that the RRC reconfiguration is complete, at 1018. Then, the IAB-donor CU 1 1006a provides the BAP configuration 1020 to the IAB-DU 1 1004a to route and perform channel mapping for traffic communicated over the configured BH RLC CH. Similarly, though not shown in FIG. 10B, the IAB-donor-CU 1 1006a may provide a second BAP configuration to the IAB-node 1002a that maps traffic communicated over the configured BH RLC CH. As the IAB-donor CU 1 1006a and IAB-donor CU 2 1006b are each connected to the respective logical parent IAB-DUs or donor-DUs 1004 and child IAB-MTs 1002, a similar procedure can be followed by IAB-donor-CU2 1006b to configure a second BH RLC CH between IAB-DU2 1004b and IAB-MT2 1002b and then provide separate BAP configuration to process traffic communicated over the second BH RLC CH. The IAB-donor CU's (e.g., 1006a and 1006b) each provide their own messages (e.g., 1010, 1016, 1020) to the IAB-DU. The parent IAB-DU 1004 selects unique LCIDs across all BH RLC CHs configured, whether by IAB-donor-CU 1 1006a or IAB-donor-CU2 1006b. This allows the IAB-DU 1004 and the IAB-MT 1002 to perform name-space differentiation based on the LCID, where IAB-DU 1004 and IAB-MT 1002 can resolve BH RLC CH IDs from LCIDs even when the BH RLC CH IDs selected by the two CUs 1006a and 1006b collide.

Figure 11A:
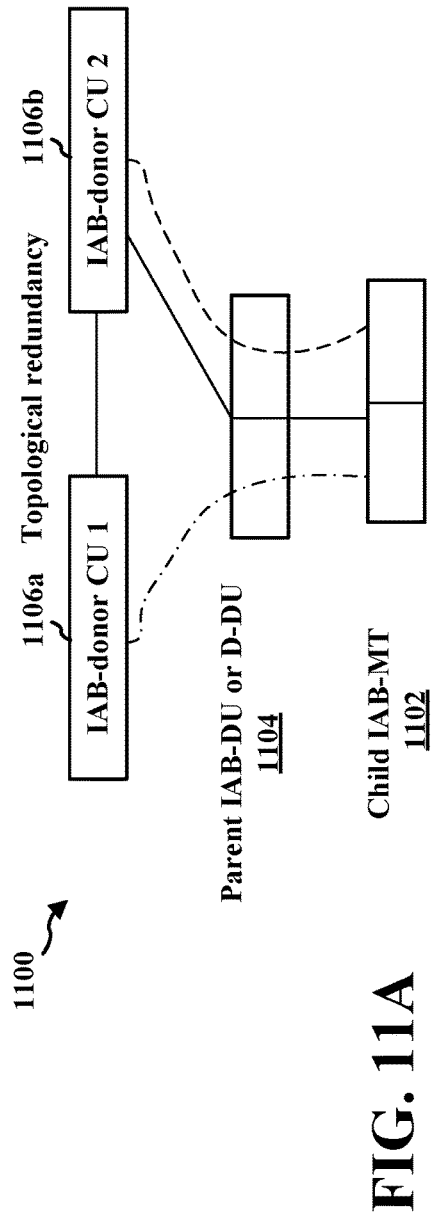
FIG. 11A illustrates an example of an IAB network having a redundant topology.
Figure 11B:
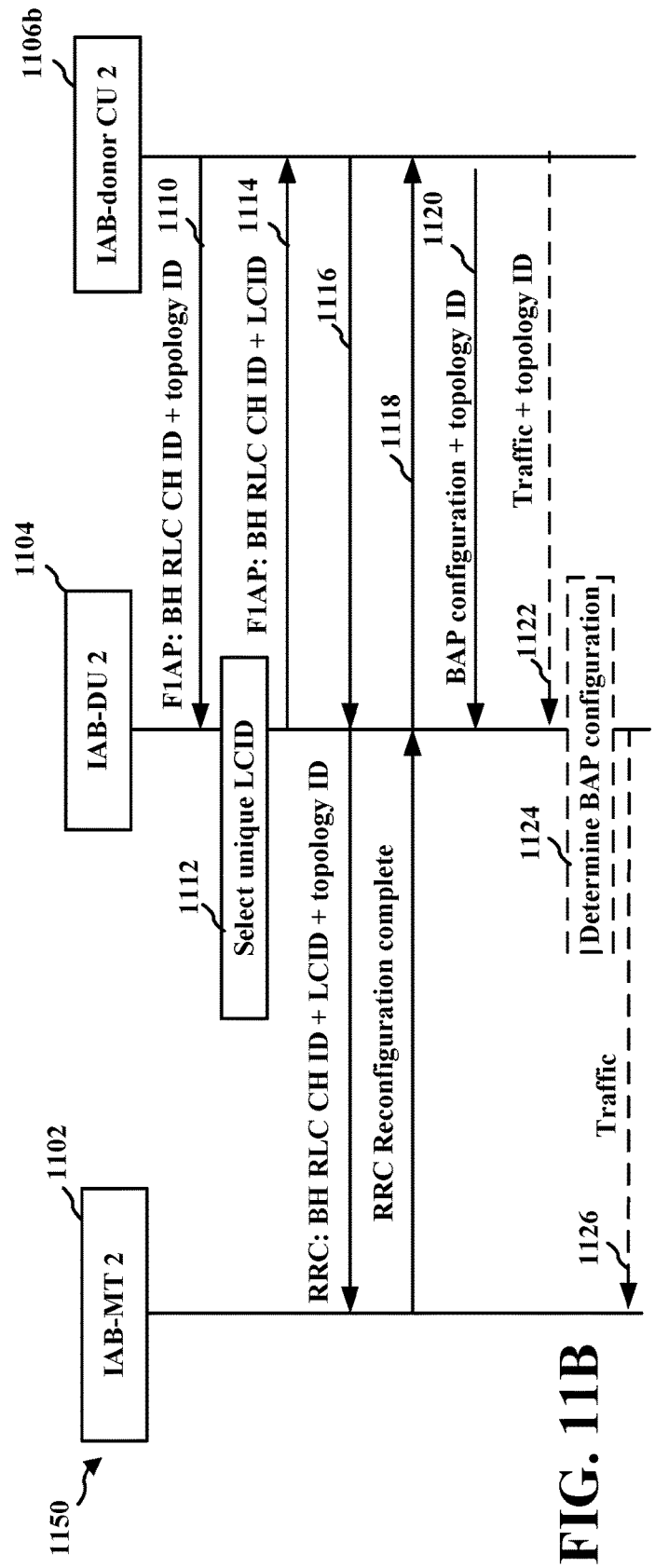
FIG. 11B illustrates an example communication flow including a BAP configuration associated with a topology identifier.

FIG. 11A illustrates a network diagram 1100 showing topological redundancy in which IAB-donor CU 1 1206a may be connected to IAB-donor CU 2 1206 having a connection to parent IAB-DU or donor-DU 1104, and which is connected to child IAB node-MT 1102. The connection of IAB-donor CU 1 1206a with IAB-donor CU 2 1206b provides topological redundancy for the IAB network. In some examples, the parent IAB-node 1104 may have a dual connection to the IAB donor CU 1 1106a and IAB donor CU 2 1106b. The parent-DU 1104 and child-MT 1102 may route traffic (could be F1-C, F1-U or non-F1 traffic) associated with CU1 1106a. The parent-DU 1104 and child-MT 1102 may also route traffic associated with CU2 1106b. As opposed to FIG. 10, parent-DU 1104 and child-MT 1102 may receive a configuration only from the CU2 1106b, whether to process and route traffic associated with either CU1 1106a or CU2 1106b. FIG. 11B illustrates an example communication flow 1150 for providing a BAP configuration between the IAB donor CU 2 1006b and IAB-DU 2 1104 for communication directed to IAB-MT 2 1102, respectively. As an example, the IAB-donor CU 2 1106b may route F1-U traffic (for itself or for IAB donor CU1 1106a) via an IAB-DU 2 1104. The IAB-donor CU 2 1106b may configure a BH RLC CH between parent IAB-DU2 1104 and child IAB-MT2 1102 and indicate the backhaul RLC channel ID for the communication and a topology identifier (ID), e.g., at 1110. This BH RLC CH may be configured to carry traffic associated with CU1 1106a or CU2 1106b. The parent IAB-DU2 1104 may be able to determine traffic communicated over this BH RLC CH is associated with what CU. While in FIG. 10 parent IAB-DU 1004 could determine this implicitly, where it associates the BH RLC CH with a CU from which the configuration message is received, e.g., associating the BH RLC CH with CU1 1006a if it receives the configuration message from CU1 1006a and it associates the BH RLC CH with CU2

1006*b* if it receives the configuration message from CU2 1006*b*. In contrast to FIG. 10B, in FIG. 11B, the parent IAB-DU 1004 receives the configuration message for the BH RLC CH from CU2 1006*b*, whether the CH carries traffic associated with CU1 1006*a* or CU2 1006*b*. For this reason, CU2 includes, in message 1010, a topology identifier together with the BH RLC CH ID to indicate an association of the configured BH RLC CH with a particular CU, which may be different than the CU providing the message to an IAB DU.

The IAB-DU 2 1104 selects a unique LCD, at 1112, similar to the example in FIG. 10B. The IAB-DU 2 1104 sends a response, at 1114 indicating the backhaul RLC channel ID and LCID to the IAB-donor CU 2 1106*b*. Although not illustrated in the figure, IAB-DU2 1104 may also include the corresponding topology identifier. The IAB donor CU 2 1106*b* then sends an RRC message 1116 indicating the backhaul RLC channel ID, LCID, and topology identifier to the IAB-MT 1102*b*. CU2 1106*b* may include a topology identifier to enable child node 1102 to create an association between the configured BH RLC CH and the topology to which traffic communicated over this BH RLC CH is associated. The IAB-MT 1102*b* responds to the IAB donor CU 2 1106*b* indicating that the RRC reconfiguration is complete, at 1118. By including the topology identifier in messages 1110 and 1116, two BH RLC CHs that carry traffic associated CU1 and CU2 may carry the same CH ID, but the parent IAB-DU 1104 and child IAB-MT2 1102 would still be able to resolve traffic communicated over the two channels based on their association with different topology IDs. Then, the IAB-donor CU 2 1106*b* provides the BAP configuration 1120 to the IAB-DU 2 104 or to IAB-MT2 1102 (not shown in the figure). The IAB-donor-CU2 1106*b* may include the topology identifier in the BAP configuration. Parent IAB-DU 1104 and child IAB-MT2 1102 may process and route traffic communicated over a BH RLC CH associated with a first topology ID using a corresponding BAP configuration associated with the first topology ID. Parent IAB-DU 1104 and child IAB-MT2 1102 may also process and route traffic communicated over a BH RLC CH associated with a second topology ID using a corresponding BAP configuration associated with the second topology ID. The IAB-donor CU 2 1106*b* may provide its own messages to the IAB-DU or may provide messages for IAB-donor CU 1 1106*a*.

Figure 12:
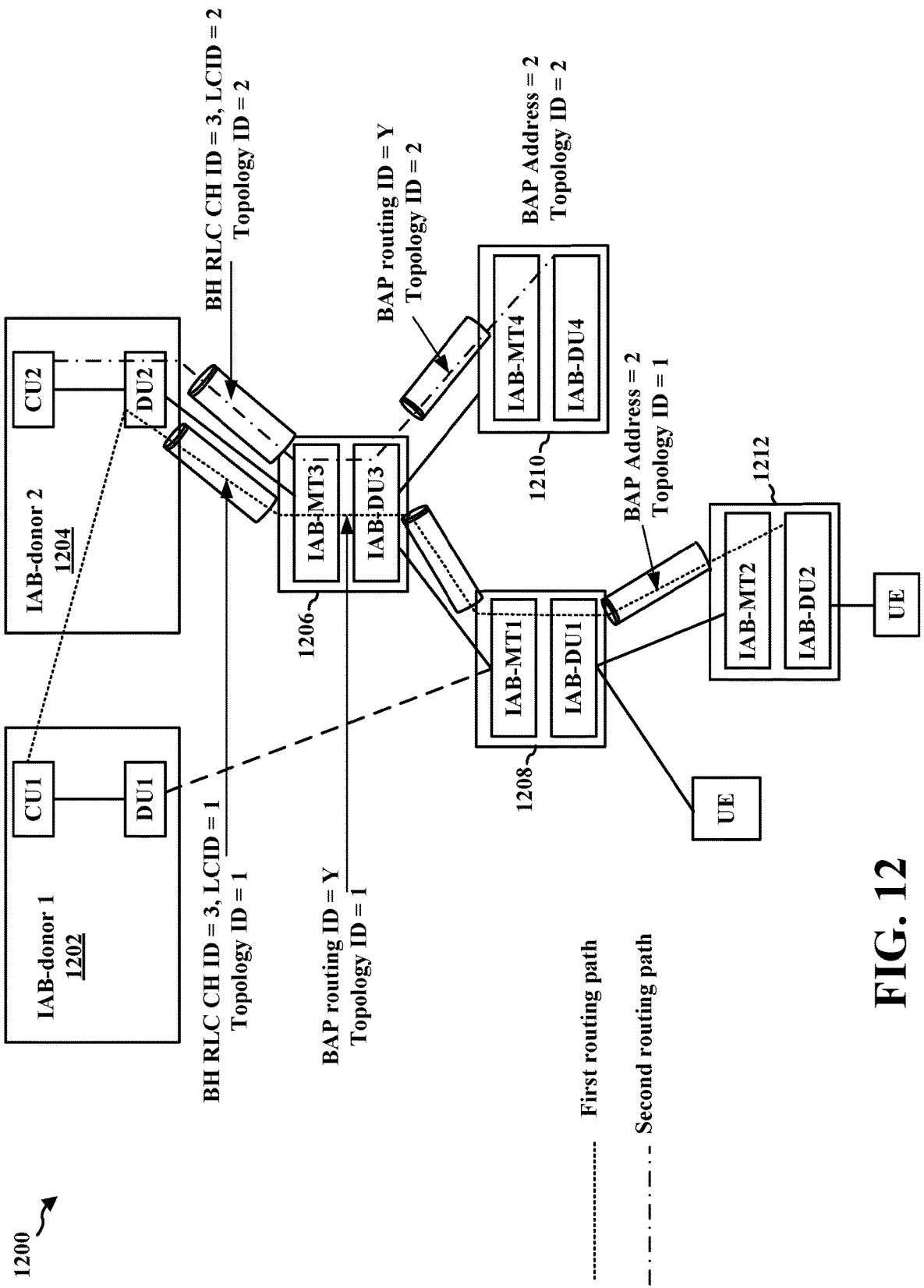
FIG. 12 is a diagram illustrating traffic associated with a topology identifier that is transmitted over an IAB network with redundant topology.

FIG. 12 illustrates example topological redundancy 1200 for IAB donors (e.g., IAB donors 1202 and 1204), similar to the topological redundancy described in connection with FIGS. 11A and 11B. An IAB-node may be connected to one or more IAB-donors. As illustrated in FIG. 12, IAB-MT1 of IAB-node 1 1208 may be dual-connected to CU1 of IAB-donor 1 1202 and CU2 of IAB-donor 2 1204. IAB-DU1 of IAB-node 1 1208 may be connected to the CU2 of the IAB-donor 2 1204. Children node of IAB-node 1, such as IAB-node 2 1212 may be connected to CU1 of IAB-donor 1 1202. IAB-node 3 1206 may be connected to the CU2 of the IAB-donor 2 1204. CU1 of the IAB-donor 1 1202 may route F1-U traffic over a secondary path via a donor-DU associated with CU2 of the IAB-donor 2 1204 to facilitate load-balancing or redundancy between the IAB-donors. As described in connection with FIGS. 11A and 11B, the BAP configuration may include an associated topology identifier. The IAB nodes may use the topology identifier associated with traffic to process the traffic based on the corresponding BAP configuration. FIG. 12 illustrates that there may be overlapping topologies.

FIG. 12 shows an example of a first routing path that carries traffic between CU1 1202 and IAB-node 2 1212 and extends along the way over donor-DU2 of donor 1204, IAB-node 3 1206 and IAB-node 1 1208. FIG. 12 shows an example of a second routing path that carries traffic between CU2 1204 and IAB-node 4 1210 and extends along the way over donor-DU2 of donor 1204 and IAB-node 3 1206.

In the example of FIG. 12, the first routing path and the second routing path may have the same BAP routing ID (=Y in FIG. 12). Thus, traffic received for instance by IAB-node 3 1206 from donor-DU2 may carry the same routing ID=Y whether this traffic corresponds to the first path and is to be routed left to IAB-node 1, or corresponds to the second path and is to be routed right to IAB-node 2.

Moreover, both traffic pieces may indicate (as part of the BAP routing ID) the same destination BAP address (e.g. BAP address=2 for IAB-node 2 1212 and BAP address=2 for IAB-node 4 1210).

Furthermore, IAB-node 3 1206 may receive from donor-DU2 traffic associated with the first routing path on a first BH RLC CH and receive from donor-DU2 traffic associated with the second routing path on a second BH RLC CH. As shown in FIG. 12, both BH RLC CHs may carry the same CH ID (e.g. ID=3).

However, as described in FIG. 11, the two CHs may be associated with different topology identifiers when these CHs are configured. In the example of FIG. 12, the first BH RLC CH is associated with topology identifier=1 and the second BH RLC CH is associated with topology identifier=2. For traffic communicated between IAB-node 3 1206 and donor-DU2, either traffic differentiation may be done based on the BAP routing ID (where the topology identifier may be part of the BAP routing ID) or BH RLC CH ID or LCD. In the example of FIG. 12 and similar to FIG. 11, each LCID may be selected such that it is associated with a topology identifier. For instance, one BH RLC CH between IAB-node 3 1206 and donor-DU2 has a LCID=1 and may be associated with topology ID=1, and another BH RLC CH has LCID=2 and may be associated with topology ID=2. This way, when IAB-node 3 receives a packet from donor-DU2 that carries LCID=1, IAB-node 3 associates this packet with topology ID=1, so this packet can be routed based on a BAP configuration that is associated with topology ID=1. Similarly, when IAB-node 3 receives a packet from donor-DU2 that carries LCID=2, IAB-node 3 associates this packet with topology ID=2 and routes the packet using a BAP configuration associated with topology ID=2. Thus, traffic associated with the two routing paths can be transported correctly across the overlapping topologies. Similar examples apply at the other IAB-nodes. Similar scenarios also hold when IAB-node 1 is single-connected to IAB-node 3 while traffic flows across the different topology sections to UEs and MTs underneath IAB-node 3 that are associated with CU1.

Aspects provided herein facilitate the donor CUs to improve communication by providing a BAP configuration that includes a topology identifier corresponding to a topology for which traffic associated with the topology is transported based on the configuration, as described in connection with FIGS. 11A and 11B. The IAB-donor CU sends, to an IAB node or IAB-donor DU, the BAP configuration associated with the IAB backhaul traffic transport. The IAB-node 1104 may ACK the BAP configuration and include the topology identifier in the ACK message. The IAB-node 1104 may receive the BAP configuration 1120 over F1-C or RRC.

When sending traffic, the IAB-donor-CU may indicate, to the IAB node, a topology identifier for the type. For example, in FIG. 11B, the IAB donor CU 2 1106*b* sends traffic 1122 along with an indication of the corresponding topology D. The IAB-DU 1104 determines the BAP configuration corresponding to the topology ID, at 1124. The IAB-DU 1104 processes the traffic 1126 using the corresponding BAP configuration associated with the topology ID.

The BAP configuration 1120 may comprise a BAP address configuration for the IAB-node or IAB-donor-DU. The BAP configuration 1120 may comprise a setup of a BH RLC CH at an IAB-node MT. The BAP configuration 1120 may comprise a setup of a BH RLC CH at an IAB-node DU or IAB-donor-DU. The BAP configuration 1120 may comprise modification of a BH RLC CH. The BAP configuration 1120 may comprise an uplink mapping configuration between an upper layer traffic type or IP header field and a BAP routing ID, egress link (next-hop BAP address), or egress BH RLC CH at an IAB-node. The BAP configuration 1120 may comprise a downlink mapping configuration between an IP header field and a BAP routing ID, egress link (next-hop BAP address), or egress BH RLC CH at an IAB-donor-DU or IAB-node. The BAP configuration 1120 may comprise a routing configuration at an intermediate IAB-node along a BAP route between a BAP routing ID and an egress link (next-hop BAP address). The BAP configuration 1120 may comprise a BH RLC CH mapping configuration between an ingress BH RLC CH and an egress BH RLC CH. The IAB-donor CU may provide the topology identifier comprised as a part of the BAP routing ID. The IAB-donor CU may provide the topology identifier as a part of the BH RLC CH.

The IAB-donor-CU, e.g., 1106*b*, may indicate to an IAB-node 1104 a topology identifier for a traffic type (e.g. F1-C signaling, F1-U tunnel, non-F1, etc.) at the IAB-node.

The IAB-node 1104 (e.g., whether the IAB donor DU or IAB-DU) may receive multiple BAP configurations that each carry a topology identifier. For example, the IAB node 1104 may receive a first BAP configuration that carries a first topology identifier corresponding to a first topology and may receive a second BAP configuration that carries a second topology identifier corresponding to a second topology. The IAB node 1104 processes traffic according to the corresponding BAP configuration 1120 that is associated with the topology identifier. For example, the IAB node 1104 processes the traffic associated with the first topology using the first BAP configuration and processes traffic associated with the second topology using the second BAP configuration. The topology identifier may be part of BAP routing ID. For example, the IAB-node or IAB-donor-DU (e.g., 1104) may further communicate a packet that carries a BAP routing ID with the first topology identifier. The IAB-node or IAB-donor-DU 1104 processes this packet as traffic associated with the first topology corresponding to the first topology identifier.

The IAB-node 1104 may receive the first topology identifier for a traffic type (e.g. F1-C signaling, F1-U tunnel, non-F1) at the IAB-node. The IAB-node 1104 processes this traffic as traffic associated with the first topology. A particular traffic type (e.g. F1-C signaling, F1-U tunnel, non-F1) at the IAB-node may default to a particular topology identifier, e.g., the first topology identifier, in some examples. As one, non-limiting example, a traffic type associated with a first IAB-donor-CU (e.g., IAB donor CU 1 1106*a*) may default to the first topology identifier. Other traffic types may similar default to a particular topology identifier. As another example, traffic communicated with a first IAB-donor-CU (e.g., IAB donor CU 1006*a*) via the IAB-donor-DU 1104 may default to the first topology identifier.

The IAB-node-DU or IAB-donor-DU (e.g., 1104) may configure a first BH RLC CH based on a BAP configuration with the first topology identifier. The IAB-node DU or IAB-donor-DU may allocate a first LCID corresponding to the first BH RLC CH, as illustrated at 1112. The IAB-node DU or IAB-donor-DU 1104 may further communicate a packet (e.g., traffic 1122/1126) that carries the first LCID (e.g., the LCID associated with the first topology and first BAP configuration). The IAB-node DU or IAB-donor-DU 1104 processes this packet as traffic associated with the first topology corresponding to the first topology identifier. The IAB-node-DU or IAB-donor-DU 1104 may set a portion of the first LCID (e.g., the LCID selected at 1112) to the first topology identifier.

Although aspects in FIG. 11B illustrate a downlink example, the downlink example is merely to illustrate the concept. The aspects presented herein may be applied for uplink communication.

The IAB-node MT 1102 may configure a first BH RLC CH based on a BAP configuration (e.g., 1120) with the first topology identifier. The IAB-node MT 1102 may receive a first LCID allocated for the first BH RLC CH, e.g., at 1116. The IAB-node MT 1102 may further communicate a packet that carries the first LCD. The IAB-node MT 1102 processes this packet as traffic associated with the first topology corresponding to the first topology identifier.

The IAB-node 1104 may receive a downstream packet (e.g., comprised in traffic 1122) associated with the first topology and pass the packet to upper layer processing if the packet carries a destination BAP address that matches a BAP address allocated to the IAB-node via a BAP address configuration in a BAP configuration with the first topology identifier.

The IAB-node 1104 may receive a downstream packet (e.g., comprised in traffic 1122) associated with the first topology and may forward the packet on an egress link based on a BAP routing ID carried by the packet and a routing configuration received in a BAP configuration with the first topology identifier, e.g., if the destination BAP address carried by the packet does not match a BAP address allocated to the IAB-node via a BAP address configuration in BAP configuration with the first topology identifier. The IAB-node 1104 may map the packet associated with the first topology to an egress BH RLC CH on the egress link based on the ingress BH RLC CH on which the packet is received by the IAB-node and a BH RLC CH mapping configuration received in a BAP configuration with the first topology identifier.

The IAB-node 1104 may receive an upstream packet, e.g., from IAB-MT 1102) associated with the first topology and forward the packet on an egress link based on a BAP routing ID carried by the packet and a routing configuration received in a BAP configuration with the first topology identifier.

The IAB-node 1104 may map the packet associated with the first topology to an egress BH RLC CH on the egress link based on the ingress BH RLC CH on which the packet is received by the IAB-node and a BH RLC CH mapping configuration received in a BAP configuration with the first topology identifier.

The IAB-node 1104 may receive a BAP SDU from upper layers associated with the first topology and send a corresponding packet that carries a BAP routing ID based on an upper layer traffic type of the BAP SDU or IP header fields and an uplink mapping configuration received in a BAP configuration with the first topology identifier.

The IAB-node 1104 may send the packet on an egress link based on the selected BAP routing ID and a routing configuration received in a BAP configuration with the first topology identifier.

The IAB-node 1104 may map the packet to an egress BH RLC CH on the egress link based on the upper layer traffic type or IP header fields and an uplink mapping configuration received in a BAP configuration with the first topology identifier.

An IAB-donor-DU may receive a BAP SDU from upper layers associated with the first topology and send a corresponding packet that carries a BAP routing ID based on IP header fields and a downlink mapping configuration received in a BAP configuration with the first topology identifier.

The IAB-donor-DU may send the packet on an egress link based on the selected BAP routing ID and a routing configuration received in a BAP configuration with the first topology identifier.

The IAB-donor-DU may map the packet to an egress BH RLC CH on the egress link based on IP header fields and a downlink mapping configuration received in a BAP configuration with the first topology identifier.

The IAB-donor-DU may receive an upstream packet associated with the first topology and pass the packet to upper layer processing if the packet carries a destination BAP address that matches a BAP address allocated to the IAB-donor-DU via a BAP address configuration in a BAP configuration with the first topology identifier.

Figure 13:
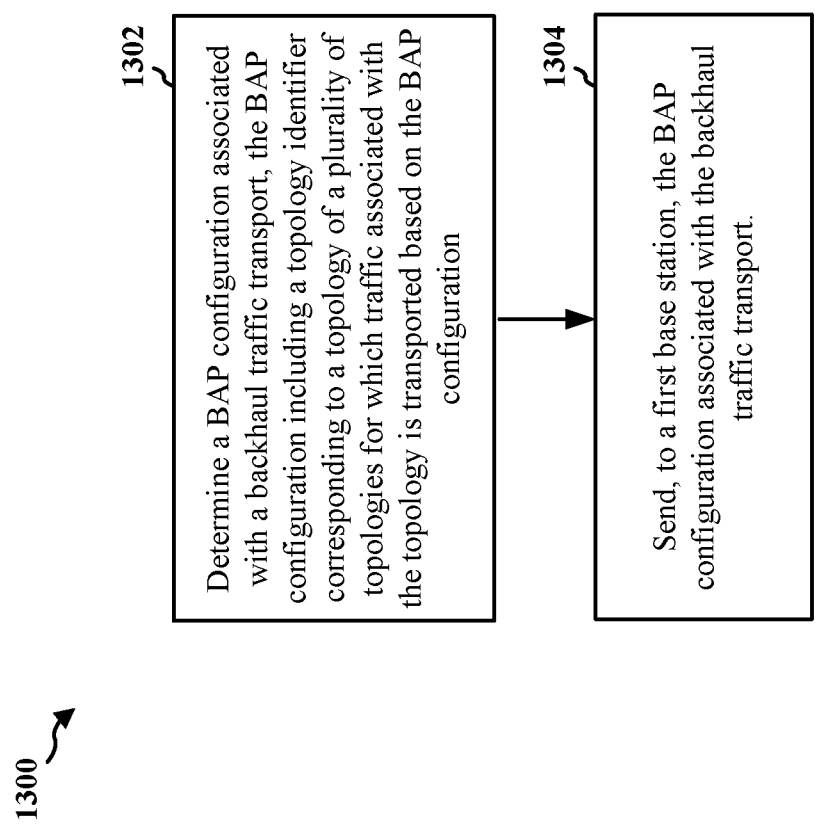
FIG. 13 is a flowchart of a method of wireless communication.

FIG. 13 is a flowchart 1300 of a method of wireless communication. The method may be performed by a network node (e.g., the base station 102/180, 350; IAB node 103; IAB donor CU 1 1106a, or IAB donor CU 2 1106b; the apparatus 1402). The network node may be referred to as a RAN node or a relay node, in some aspects. In the description of FIG. 13, the network node may be referred to as a second network node.

At 1302, the second network node determines a BAP configuration associated with a backhaul traffic transport, the BAP configuration including a topology identifier corresponding to a topology of a plurality of topologies for which traffic associated with the topology is transported based on the BAP configuration. The determination of the BAP configuration may be performed, e.g., by the BAP component 1440 of the apparatus 1402. The topology identifier may be a network node CU identifier of the second network node. The topology identifier may be at least one of part of a BAP routing ID, a part of a backhaul RLC channel ID, or a part of a BAP address. The plurality of topologies may include a first topology and a second topology that overlaps at least in part with the first topology, where the first topology carries traffic associated with the second network node and the second topology carries traffic associated with a third network node. FIGS. 11A, 11B, and 12 illustrate examples of different topologies associated with traffic in an IAB network.

At 1304, the second network node sends, to a first network node, the BAP configuration associated with the backhaul traffic transport. The transmission may be performed, e.g., by the configuration component 1442 of the apparatus 1402. For example, FIG. 11B illustrates an example of an IAB donor CU 2 1106b sending a BAP configuration 1120 including a topology identifier to the IAB node 1104. The BAP configuration may comprise, for the topology, at least one of a BAP address configuration for the first network node; a setup of a backhaul RLC channel at the first network node; a modification of the backhaul RLC channel at the first network node; an uplink mapping configuration between at least one of a traffic type or IP header field and a BAP routing ID, an egress link at the first network node, or egress backhaul RLC channel at the first network node; a downlink mapping configuration between the IP header field and the BAP routing ID, the egress link at the first network node, or the egress backhaul RLC channel at the first network node; a routing configuration along a BAP route between a BAP routing ID and the egress link at the first network node; or a backhaul RLC channel mapping configuration between an ingress backhaul RLC channel and an egress backhaul RLC channel at the first network node. The network node may further send, to the first network node, information indicating the topology identifier for a traffic type.

Figure 14:
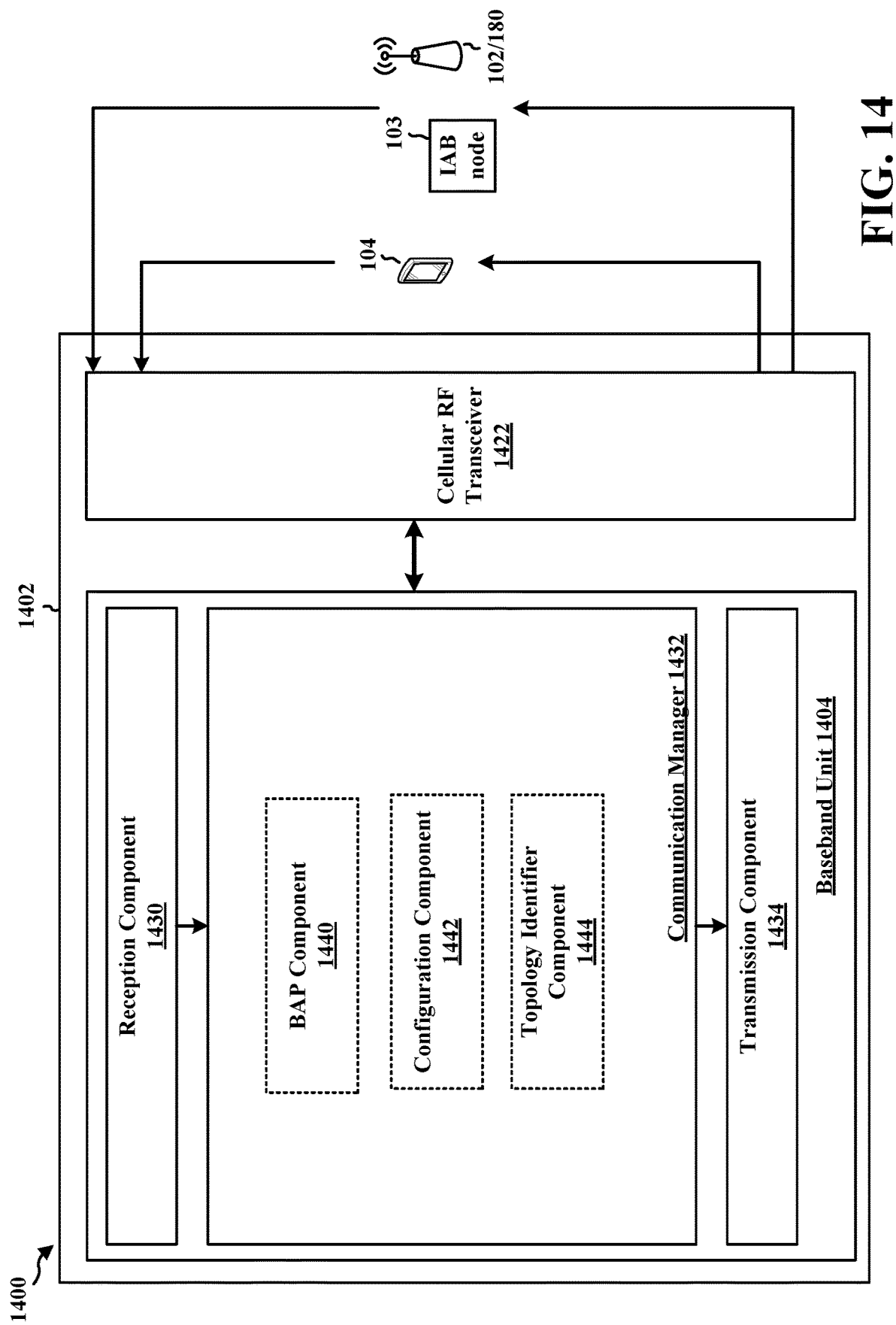
FIG. 14 is a diagram illustrating an example of a hardware implementation for an example apparatus.

FIG. 14 is a diagram 1400 illustrating an example of a hardware implementation for an apparatus 1402. The apparatus 1402 is a network node and includes a baseband unit 1404. The apparatus may be a base station, a component of a base station, or may implement base station functionality. The apparatus may be an IAB node, a component of an IAB node, or may implement IAB node functionality. In some aspects, the apparatus may be referred to as a RAN node or a relay node. In some aspects, the apparatus may be an IAB node, e.g., an IAB donor CU, such as described in connection with FIG. 11A, 11B, or 12. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the wireless device 310 and may include the memory 376 and/or at least one of the TX processor 316, the RX processor 370, and the controller/processor 375.

The communication manager 1432 includes a BAP component 1440 that determines a BAP configuration associated with a backhaul traffic transport, the BAP configuration including a topology identifier corresponding to a topology of a plurality of topologies for which traffic associated with the topology is transported based on the BAP configuration, e.g., as described in connection with 1302. The communication manager 1432 further includes a configuration component 1442 that sends, to a first network node, the BAP configuration associated with the backhaul traffic transport, e.g., as described in connection with 1304. The communication manager 1432 may further include a topology identifier component 1444 that indicates a topology identifier associated with the BAP configuration, e.g., as described in connection with any of FIGS. 11A-13.

The apparatus may include additional components that perform each of the blocks of the algorithm in the flowchart of FIG. 13 or the communication flow of FIGS. 10B and/or 11B. As such, each block in the flowchart of FIG. 13 or the communication flow of FIGS. 10B and/or 11B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for determining determines a BAP configuration associated with a backhaul traffic transport, the BAP configuration including a topology identifier corresponding to a topology of a plurality of topologies for which traffic associated with the topology is transported based on the BAP configuration and means for sending station sends, to a first network node, the BAP configuration associated with the backhaul traffic transport. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

FIG. 15A is a flowchart 1500 of a method of wireless communication. The method may be performed by a network node (e.g., the base station 102/180, 350; IAB node 103; IAB node 1104; the apparatus 1402. The network node may be referred to as a RAN node or a relay node, in some aspects.

At 1502, the first network node receives a first BAP configuration associated with a first topology identifier corresponding to a first topology, and a second BAP configuration associated with a second topology ID corresponding to a second topology that overlaps at least in part with the first topology. In some aspects, first BAP configuration may be associated with a first topology ID for the first topology, and the second BAP configuration may be associated with a second topology ID for the second topology. The reception of the BAP configurations may be performed, e.g., by the BAP configuration component 1640 of the apparatus 1602. Each of the first BAP configuration and the second BAP configuration may include, for the corresponding first topology and the second topology, respectively, at least one of: a BAP address configuration for the first network node; a setup of a backhaul RLC channel at the first network node; a modification of the backhaul RLC channel at the first network node; an uplink mapping configuration between at least one of a traffic type or IP header field and a BAP routing ID, an egress link at the first network node, or egress backhaul RLC channel at the first network node; a downlink mapping configuration between the IP header field and the BAP routing ID, the egress link at the first network node, or the egress backhaul RLC channel at the first network node; a routing configuration along a BAP route between a BAP routing ID and the egress link at the first network node; or a backhaul RLC channel mapping configuration between an ingress backhaul RLC channel and an egress backhaul RLC channel at the first network node. At least one of the first BAP configuration or the second BAP configuration may be received through at least one of RRC signal or F1-C signaling. FIG. 11B illustrates an example of an IAB node 1104 receiving a BAP configuration 1120 including a topology identifier.

The traffic may be associated with the first topology may be associated with a second network node and traffic associated with the second topology may be associated with a third network node. The traffic may be associated with the first topology or the second topology based on a default for a traffic type of the traffic. In some aspects, the traffic may be associated with a first topology ID or a second topology ID based on a default for a traffic type of the traffic. The traffic type may be at least one of F1-C signaling, F1-U tunnel, or non-F1 traffic. The traffic may be associated with the first topology by default when the traffic is communicated with a second network node, and may be associated with the second topology by default when the traffic is communicated with a third network node. In some aspects, the traffic may be associated with the first topology ID by default when the traffic is communicated with a second network node, and may be determined to be associated with the second topology ID by default when the traffic is communicated with a third network node. A first topology ID may be a network node CU identifier of the second network node and the second topology ID is a network node CU identifier of the third network node. Each of the first topology ID and the second topology ID may be at least one of part of a BAP routing ID, a part of a backhaul RLC channel ID, or a part of a BAP address.

At 1506, the first network node routes traffic associated with the first topology based on the first BAP configuration, and traffic associated with the second topology based on the second BAP configuration. The routing may be performed, e.g., by the route component 1642 of the apparatus 1602. In some aspects, the network node may route traffic associated with the first topology ID based on the first BAP configuration, and traffic associated with the second topology ID based on the second BAP configuration. FIG. 11B illustrates an example of an IAB node processing traffic based on a BAP configuration, and FIG. 12 illustrates an example of an IAB node routing traffic based on different topologies. For example, routing the traffic associated with the first topology based on the first BAP configuration, and the traffic associated with the second topology based on the second BAP configuration may include transmitting a packet within information indicating whether the packet is associated with the first topology (e.g., a first topology ID) or the second topology (e.g., the second topology ID).

In some aspects, the routing the traffic, at 1506, may include receiving a downstream packet associated with the first topology ID; and passing the packet to upper layer processing when the packet carries a destination BAP address that matches a BAP address allocated to the first network node via a BAP address configuration in the first BAP configuration with the first topology ID.

As another example, the routing the traffic, at 1506, may include receiving a downstream packet associated with the first topology ID and forwarding the packet to an egress link based on a BAP routing ID carried by the packet and a routing configuration received in the first BAP configuration with the first topology ID when a destination BAP address carried by the packet mismatches a BAP address allocated to the first network node via a BAP address configuration in a third BAP configuration with the first topology ID. Routing the traffic may include mapping the packet associated with the first topology ID to an egress backhaul RLC channel on the egress link based on an ingress backhaul RLC channel on which the packet is received by the first network node and based on a backhaul RLC channel mapping received in a fourth BAP configuration with the first topology ID.

As another example, the routing the traffic, at 1506, may include receiving an upstream packet associated with the first topology ID; and forwarding the packet to an egress link based on a BAP routing ID carried by the packet and a routing configuration received in the first BAP configuration with the first topology ID. Routing the traffic, at 1506, may include mapping the packet associated with the first topology ID to an egress backhaul RLC channel on the egress link based on an ingress backhaul RLC channel on which the packet is received by the first network node and based on a backhaul RLC channel mapping received in a third BAP configuration with the first topology ID.

As another example, the routing the traffic, at 1506, may include receiving a BAP SDU associated with the first topology ID; and sending a corresponding packet that carries a BAP routing ID based on a traffic type of the BAP SDU or IP header fields and based on an uplink mapping configuration received in the first BAP configuration with the first topology ID. The packet may be sent on an egress link based on the BAP routing ID and a routing configuration received in a third BAP configuration with the first topology ID. The packet may be mapped to an egress backhaul radio link control (RLC) channel on the egress link based on the traffic type or the IP header fields and based on the uplink mapping configuration received in a fourth BAP configuration with the first topology ID.

As another example, the routing the traffic, at 1506, may include receiving a BAP SDU associated with the first topology ID; and sending a corresponding packet that carries a BAP routing ID based on IP header fields and a downlink mapping configuration received in the first BAP configuration with the first topology ID. The packet may be sent on an egress link based on the BAP routing ID and a routing configuration received in a third BAP configuration with the first topology ID. The packet may be mapped to an egress backhaul radio link control (RLC) channel on the egress link based on the IP header fields and based on the downlink mapping configuration received in a fourth BAP configuration with the first topology ID.

As another example, the routing the traffic, at 1506, may include receiving an upstream packet associated with the first topology ID; and passing the packet to upper layer processing when the packet carries a destination BAP address that matches a BAP address allocated to the first network node via a BAP address configuration in the first BAP configuration with the first topology ID.

FIG. 15B illustrates a flowchart 1550 of a method of wireless communication that may include 1502 and 1506, as described in connection with FIG. 15A. In some aspects, at 1504, the first network node may further determine whether traffic is associated with the first topology or the second topology. In some aspects, the network node may determine whether traffic is associated with the first topology ID or the second topology ID. The determination may be performed, e.g., by the topology identifier component 1644 of the apparatus 1602. FIG. 11B illustrates an IAB node 1104 determining, e.g., a BAP configuration based on a topology identifier associated with traffic. The traffic associated with the first topology may be associated with a second network node and traffic associated with the second topology may be associated with a third network node. The first topology ID may be a network node CU identifier of the second network node and the second topology ID is a network node CU identifier of the third network node. Each of the first topology ID and the second topology ID may be at least one of part of a BAP routing ID, a part of a backhaul RLC channel ID, or a part of a BAP address. The traffic may be determined to be associated with the first topology or the second topology based on a default for a traffic type of the traffic. In some aspects, the traffic may be determined to be associated with the first topology ID or the second topology ID based on a default for a traffic type of the traffic. The traffic type may be at least one of F1-C signaling, F1-U tunnel, or non-F1 traffic. The traffic may be determined to be associated with the first topology by default when the traffic is communicated with a second network node, and may be determined to be associated with the second topology by default when the traffic is communicated with a third network node. In some aspects, the traffic may be determined to be associated with the first topology ID by default when the traffic is communicated with a second network node, and may be determined to be associated with the second topology ID by default when the traffic is communicated with a third network node.

As illustrated at 1503, the first network node may receive information indicating that at least one of the first topology ID or the second topology ID is associated with a particular traffic type, wherein the traffic is routed, at 1506, based on the received information. The reception may be performed, e.g., by the topology identifier component 1644 of the apparatus 1602. The traffic type may be at least one of F1-C signaling, F1-U tunnel, or non-F1 traffic, for example.

As illustrated at 1508, the first network node may configure a first backhaul RLC channel based on the first BAP configuration with the first topology ID. The configuration may be performed, e.g., by the BH RLC CH component 1646 of the apparatus 1602.

As illustrated at 1510, the first network node may allocate a first LCID corresponding to the first backhaul RLC channel. The allocation may be performed, e.g., by the allocation component 1648 of the apparatus 1602. The routing the traffic, at 1506, may comprise communicating a packet that includes the first LCID corresponding to the first backhaul RLC channel, the communicating the packet comprising processing the packet as traffic associated with the first topology corresponding to the first topology ID. For example, at least a portion of the first LCID may be allocated to include the first topology ID.

As illustrated at 1510, the first network node may receive a first LCID allocated for the first backhaul RLC channel. The reception may be performed, e.g., by the LCID component 1650 of the apparatus 1602, for example. The routing the traffic, at 1506, may include communicating a packet that includes the first LCID corresponding to the first backhaul RLC channel, the communicating the packet comprising processing the packet as traffic associated with the first topology corresponding to the first topology ID.

As illustrated at 1512, the first network node may transmit an acknowledgment to acknowledge reception of at least one of the first BAP configuration or the second BAP configuration, the acknowledgment including at least one of the first topology ID or the second topology ID. The transmission may be performed, e.g., by the feedback component 1652 of the apparatus 1602.

Figure 16:
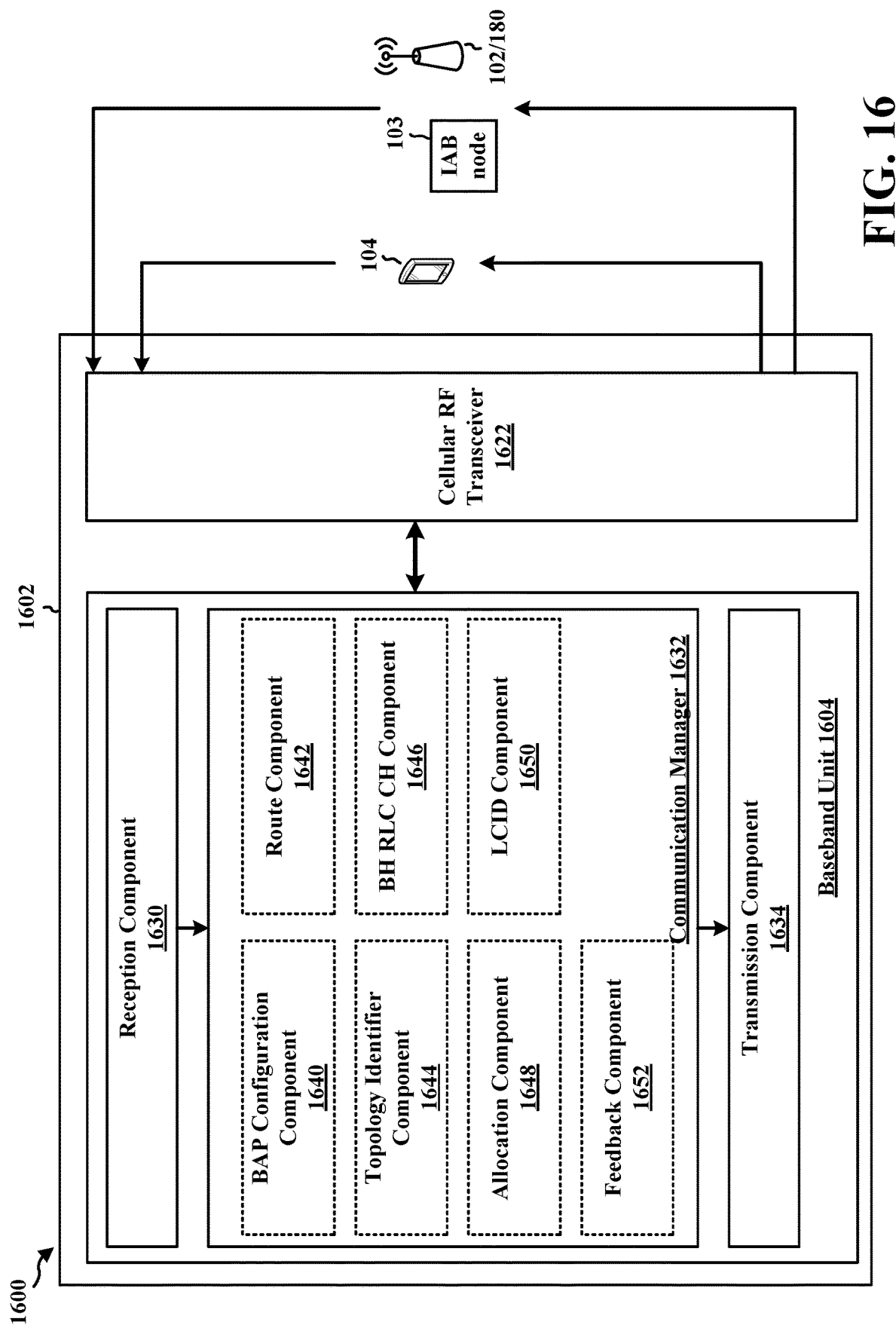
FIG. 16 is a diagram illustrating an example of a hardware implementation for an example apparatus.

FIG. 16 is a diagram 1600 illustrating an example of a hardware implementation for an apparatus 1602. The apparatus 1602 is a network node and includes a baseband unit 1604. The apparatus may be a base station, a component of a base station, or may implement base station functionality. The apparatus may be an IAB node, a component of an IAB node, or may implement IAB node functionality. In some aspects, the apparatus may be referred to as a RAN node or a relay node. In some aspects, the apparatus may be an IAB node, such as described in connection with FIG. 11A, 11B, or 12. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the wireless device 310 and may include the memory 376 and/or at least one of the TX processor 316, the RX processor 370, and the controller/processor 375.

The communication manager 1632 includes a BAP configuration component 1640 that is configured to receive a first BAP configuration associated with a first topology, and a second BAP configuration associated with a second topology that overlaps at least in part with the first topology, e.g., as described in connection with 1502. The communication manager 1632 further includes a route component 1642 that routes traffic associated with the first topology based on the first BAP configuration, and traffic associated with the second topology based on the second BAP configuration, e.g., as described in connection with 1506. The communication manager 1632 further includes a BH RLC CH component 1646 that configures a first backhaul RLC channel based on the first BAP configuration with the first topology, e.g., as described in connection with 1508. The communication manager 1632 further includes a topology identifier component 1644 that station determines whether traffic is associated with the first topology or the second topology, e.g., as described in connection with 1504. The communication manager 1632 further includes an allocation component 1648 that is configured to allocate a first LCID corresponding to the first backhaul RLC channel, e.g., as described in connection with 1510 or 1512. The communication manager 1632 further includes an LCID component 1650 that is configured to receive a first LCID allocated for the first backhaul RLC channel, e.g., as described in connection with 1514. The communication manager 1632 further includes a feedback component 1652 that is configured to transmit an acknowledgment to acknowledge reception of at least one of the first BAP configuration or the second BAP configuration, e.g., as described in connection with 1514.

Figure 15:
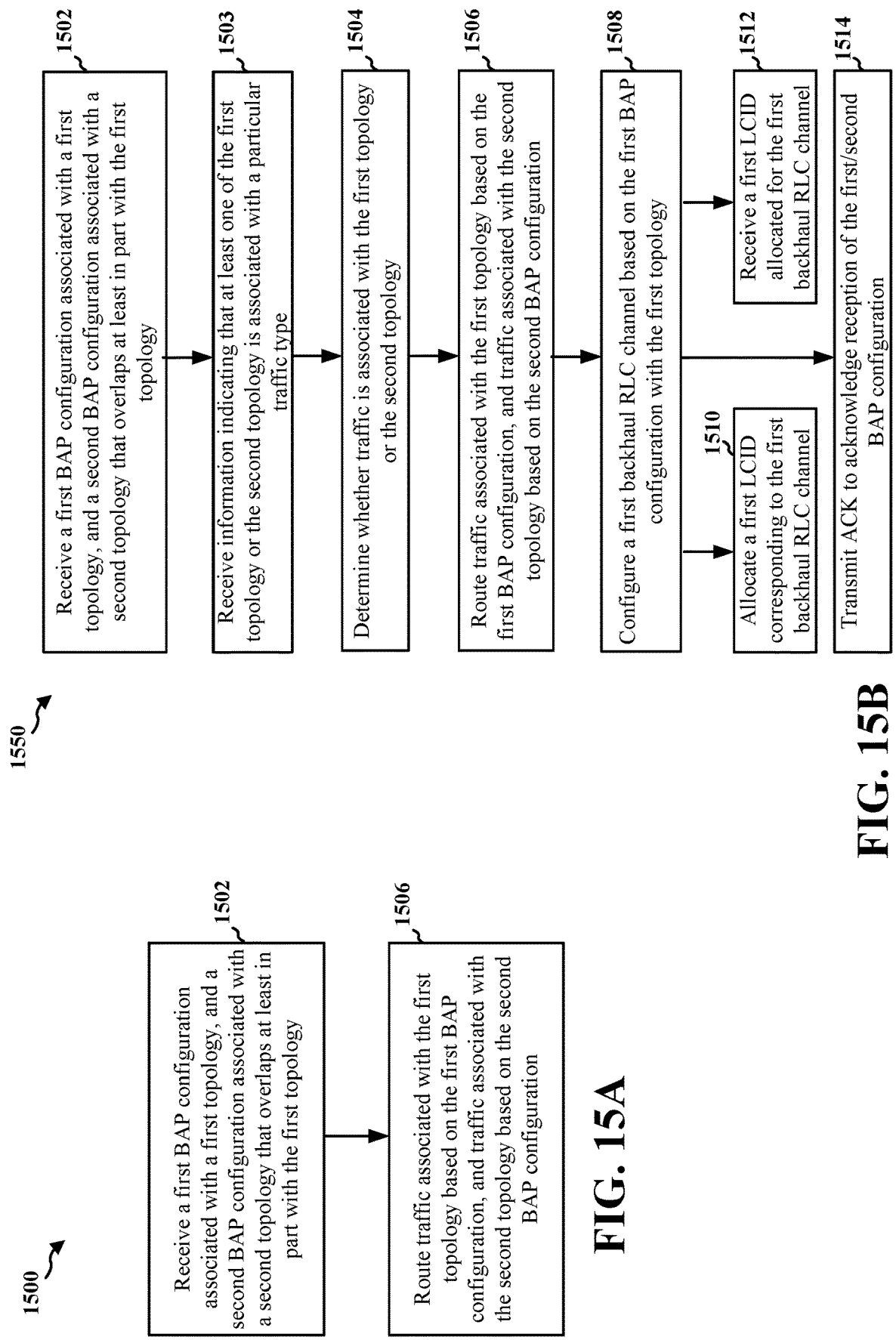
FIGS. 15A and 15B are flowcharts of methods of wireless communication.

The apparatus may include additional components that perform each of the blocks of the algorithm in the flowchart of FIG. 15 and the aspects described in connection with FIGS. 11A-12. As such, each block in the flowchart of FIG. 15 and the aspects described in connection with FIGS. 11A-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means receiving a first BAP configuration associated with a first topology corresponding to a first topology, and a second BAP configuration associated with a second topology corresponding to a second topology that overlaps at least in part with the first topology; and means for routing traffic associated with the first topology based on the first BAP configuration, and traffic associated with the second topology based on the second BAP configuration. The apparatus 1602 may further include means for determining whether traffic is associated with the first topology or the second topology. The apparatus 1602 may further include means for receiving information indicating that at least one of the first topology or the second topology is associated with a particular traffic type, wherein the traffic is routed based on the received information. The apparatus 1602 may further include means for configuring a first backhaul RLC channel based on the first BAP configuration with the first topology; and means for allocating a first LCID corresponding to the first backhaul RLC channel, wherein the routing the traffic comprises communicating a packet that includes the first LCID corresponding to the first backhaul RLC channel, the communicating the packet comprising processing the packet as traffic associated with the first topology corresponding to the first topology ID. The apparatus 1602 may further include means for configuring a first backhaul RLC channel based on the first BAP configuration with the first topology ID; and means for receiving a first LCID allocated for the first backhaul RLC channel, wherein the routing the traffic comprises communicating a packet that includes the first LCID corresponding to the first backhaul RLC channel, the communicating the packet comprising processing the packet as traffic associated with the first topology corresponding to the first topology ID. The apparatus 1602 may further include means for receiving a downstream packet associated with the first topology ID and means for passing the packet to upper layer processing when the packet carries a destination BAP address that matches a BAP address allocated to the first network node via a BAP address configuration in the first BAP configuration with the first topology ID. The apparatus 1602 may further include means for receiving a downstream packet associated with the first topology ID and means for forwarding the packet to an egress link based on a BAP routing ID carried by the packet and a routing configuration received in the first BAP configuration with the first topology ID when a destination BAP address carried by the packet mismatches a BAP address allocated to the first network node via a BAP address configuration in a third BAP configuration with the first topology ID. The apparatus 1602 may further include means for receiving an upstream packet associated with the first topology ID; and means for forwarding the packet to an egress link based on a BAP routing ID carried by the packet and a routing configuration received in the first BAP configuration with the first topology ID. The apparatus 1602 may further include means for receiving a BAP SDU associated with the first topology ID; and means for sending a corresponding packet that carries a BAP routing ID based on a traffic type of the BAP SDU or IP header fields and based on an uplink mapping configuration received in the first BAP configuration with the first topology ID. The apparatus 1602 may further include means for receiving a BAP SDU associated with the first topology ID; and means for sending a corresponding packet that carries a BAP routing ID based on IP header fields and a downlink mapping configuration received in the first BAP configuration with the first topology ID. The apparatus 1602 may further include means for receiving an upstream packet associated with the first topology ID; and means for passing the packet to upper layer processing when the packet carries a destination BAP address that matches a BAP address allocated to the first network node via a BAP address configuration in the first BAP configuration with the first topology ID. The apparatus 1602 may further include means for transmitting an acknowledgment to acknowledge reception of at least one of the first BAP configuration or the second BAP configuration, the acknowledgment including at least one of the first topology ID or the second topology ID. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a first BS, comprising: receiving a first BAP configuration associated with a first topology ID corresponding to a first topology, and a second BAP configuration associated with a second topology ID corresponding to a second topology that overlaps at least in part with the first topology; determining whether traffic is associated with the first topology ID or the second topology ID; and routing traffic associated with the first topology ID based on the first BAP configuration, and traffic associated with the second topology ID based on the second BAP configuration.

In aspect 2, the method of aspect 1 further includes that each of the first BAP configuration and the second BAP configuration comprises, for the corresponding first topology and the second topology, respectively, at least one of: a BAP address configuration for the first BS; a setup of a backhaul RLC channel at the first BS; a modification of the backhaul RLC channel at the first BS; an uplink mapping configuration between at least one of a traffic type or IP header field and a BAP routing ID, an egress link at the first BS, or egress backhaul RLC channel at the first BS; a downlink mapping configuration between the IP header field and the BAP routing ID, the egress link at the first BS, or the egress backhaul RLC channel at the first BS; a routing configuration along a BAP route between a BAP routing ID and the egress link at the first BS; or a backhaul RLC channel mapping configuration between an ingress backhaul RLC channel and an egress backhaul RLC channel at the first BS.

In aspect 3, the method of aspect 1 or aspect 2 further includes that traffic associated with the first topology is associated with a second BS and traffic associated with the second topology is associated with a third BS.

In aspect 4, the method of any of aspects 1-3 further includes that the first topology ID is a BS CU identifier of the second BS and the second topology ID is a BS CU identifier of the third BS.

In aspect 5, the method of any of aspects 1-3 further includes that each of the first topology ID and the second topology ID is at least one of part of a BAP routing ID, a part of a backhaul RLC channel ID, or a part of a BAP address.

In aspect 6, the method of any of aspects 1-5 further includes that the routing the traffic associated with the first topology ID based on the first BAP configuration, and the traffic associated with the second topology ID based on the second BAP configuration comprises transmitting a packet within information indicating whether the packet is associated with the first topology ID or the second topology ID.

In aspect 7, the method of any of aspects 1-6 further includes that the receiving information indicating that at least one of the first topology ID or the second topology ID is associated with a particular traffic type, wherein the traffic is routed based on the received information.

In aspect 8, the method of any of aspects 1-7 further includes that the traffic type is at least one of F1-C signaling, F1-U tunnel, or non-F1 traffic.

In aspect 9, the method of any of aspects 1-6 further includes that the traffic is determined to be associated with the first topology ID or the second topology ID based on a default for a traffic type of the traffic.

In aspect 10, the method of any of aspects 1-6 or 9 further includes that the traffic type is at least one of F1-C signaling, F1-U tunnel, or non-F1 traffic.

In aspect 11, the method of any of aspects 1-6 or 9 further includes that the traffic is determined to be associated with the first topology ID by default when the traffic is communicated with a second BS, and is determined to be associated with the second topology ID by default when the traffic is communicated with a third BS.

In aspect 12, the method of any of aspects 1-11 further includes configuring a first backhaul RLC channel based on the first BAP configuration with the first topology ID; and allocating a first LCID corresponding to the first backhaul RLC channel, wherein the routing the traffic comprises communicating a packet that includes the first LCID corresponding to the first backhaul RLC channel, the communicating the packet comprising processing the packet as traffic associated with the first topology corresponding to the first topology ID.

In aspect 13, the method of any of aspects 1-12 further includes that at least a portion of the first LCID is allocated to include the first topology ID.

In aspect 14, the method of any of aspects 1-11 further includes configuring a first backhaul RLC channel based on the first BAP configuration with the first topology ID; and receiving a first LCID allocated for the first backhaul RLC channel, wherein the routing the traffic comprises communicating a packet that includes the first LCID corresponding to the first backhaul RLC channel, the communicating the packet comprising processing the packet as traffic associated with the first topology corresponding to the first topology ID.

In aspect 15, the method of any of aspects 1-14 further includes that the routing the traffic comprises: receiving a downstream packet associated with the first topology ID; and passing the packet to upper layer processing when the packet carries a destination BAP address that matches a BAP address allocated to the first BS via a BAP address configuration in the first BAP configuration with the first topology ID.

In aspect 16, the method of any of aspects 1-14 further includes that the routing the traffic comprises: receiving a downstream packet associated with the first topology ID; and forwarding the packet to an egress link based on a BAP routing ID carried by the packet and a routing configuration received in the first BAP configuration with the first topology ID when a destination BAP address carried by the packet mismatches a BAP address allocated to the first BS via a BAP address configuration in a third BAP configuration with the first topology ID.

In aspect 17, the method of any of aspects 1-14 or 16 further includes that the routing the traffic comprises mapping the packet associated with the first topology ID to an egress backhaul RLC channel on the egress link based on an ingress backhaul RLC channel on which the packet is received by the first BS and based on a backhaul RLC channel mapping received in a fourth BAP configuration with the first topology ID.

In aspect 18, the method of any of aspects 1-14 further includes that the routing the traffic comprises: receiving an upstream packet associated with the first topology ID; and forwarding the packet to an egress link based on a BAP routing ID carried by the packet and a routing configuration received in the first BAP configuration with the first topology ID.

In aspect 19, the method of any of aspects 1-14 or 18 further includes that the routing the traffic comprises mapping the packet associated with the first topology ID to an egress backhaul RLC channel on the egress link based on an ingress backhaul RLC channel on which the packet is received by the first BS and based on a backhaul RLC channel mapping received in a third BAP configuration with the first topology ID.

In aspect 20, the method of any of aspects 1-19 further includes receiving a BAP SDU associated with the first topology ID; and sending a corresponding packet that carries a BAP routing ID based on a traffic type of the BAP SDU or IP header fields and based on an uplink mapping configuration received in the first BAP configuration with the first topology ID.

In aspect 21, the method of any of aspects 1-20 further includes that the packet is sent on an egress link based on the BAP routing ID and a routing configuration received in a third BAP configuration with the first topology ID.

In aspect 22, the method of any of aspects 1-21 further includes the packet is mapped to an egress backhaul RLC channel on the egress link based on the traffic type or the IP header fields and based on the uplink mapping configuration received in a fourth BAP configuration with the first topology ID.

In aspect 23, the method of any of aspects 1-19 further includes that the routing the traffic comprises: receiving a BAP SDU associated with the first topology ID; and sending a corresponding packet that carries a BAP routing ID based on IP header fields and a downlink mapping configuration received in the first BAP configuration with the first topology ID.

In aspect 24, the method of any of aspects 1-19 or 23 further includes that the packet is sent on an egress link based on the BAP routing ID and a routing configuration received in a third BAP configuration with the first topology ID.

In aspect 25, the method of any of aspects 1-19, 23, or 24 further includes that the packet is mapped to an egress backhaul RLC channel on the egress link based on the IP header fields and based on the downlink mapping configuration received in a fourth BAP configuration with the first topology ID.

In aspect 26, the method of any of aspects 1-25 further includes that the routing the traffic comprises: receiving an upstream packet associated with the first topology ID; and passing the packet to upper layer processing when the packet carries a destination BAP address that matches a BAP address allocated to the first BS via a BAP address configuration in the first BAP configuration with the first topology ID.

In aspect 27, the method of any of aspects 1-26 further includes transmitting an acknowledgment to acknowledge reception of at least one of the first BAP configuration or the second BAP configuration, the acknowledgment including at least one of the first topology ID or the second topology ID.

In aspect 28, the method of any of aspects 1-27 further includes that at least one of the first BAP configuration or the second BAP configuration is received through at least one of RRC signal or F1-C signaling.

Aspect 29 includes an apparatus for wireless communication of a first BS, comprising: means for receiving a first BAP configuration associated with a first topology ID corresponding to a first topology, and a second BAP configuration associated with a second topology ID corresponding to a second topology that overlaps at least in part with the first topology; means for determining whether traffic is associated with the first topology ID or the second topology ID; and means for routing traffic associated with the first topology ID based on the first BAP configuration, and traffic associated with the second topology ID based on the second BAP configuration.

In aspect 30, the apparatus of aspect 29 further includes means to perform the method of any of aspects 2-28.

Aspect 31 is an apparatus for wireless communication of a first BS, comprising: a memory; and at least one processor coupled to the memory and configured to: receive a first BAP configuration associated with a first topology ID corresponding to a first topology, and a second BAP configuration associated with a second topology ID corresponding to a second topology that overlaps at least in part with the first topology; determine whether traffic is associated with the first topology ID or the second topology ID; and route traffic associated with the first topology ID based on the first BAP configuration, and traffic associated with the second topology ID based on the second BAP configuration.

In aspect 32, the apparatus of aspect 31 further includes the at least one processor is further configured to perform the method of any of claims 2-28.

Aspect 33 is a computer-readable medium (e.g., non-transitory computer-readable medium) storing computer executable code for wireless communication of a first B S, the code when executed by a processor causes the processor to: receive a first BAP configuration associated with a first topology ID corresponding to a first topology, and a second BAP configuration associated with a second topology ID corresponding to a second topology that overlaps at least in part with the first topology; determine whether traffic is associated with the first topology ID or the second topology ID; and route traffic associated with the first topology ID based on the first BAP configuration, and traffic associated with the second topology ID based on the second BAP configuration.

In aspect 34, the computer-readable medium of aspect 33, further comprises code to perform the method of any of claims 2-28.

Aspect 35 is a method of wireless communication of a second BS, comprising: determining a BAP configuration associated with a backhaul traffic transport, the BAP configuration including a topology identifier corresponding to a topology of a plurality of topologies for which traffic associated with the topology is transported based on the BAP configuration; and sending, to a first BS, the BAP configuration associated with the backhaul traffic transport.

In aspect 36, the method of aspect 35 further includes that the BAP configuration comprises, for the topology, at least one of: a BAP address configuration for the first BS; a setup of a backhaul RLC channel at the first BS; a modification of the backhaul RLC channel at the first BS; an uplink mapping configuration between at least one of a traffic type or IP header field and a BAP routing ID, an egress link at the first BS, or egress backhaul RLC channel at the first BS; a downlink mapping configuration between the IP header field and the BAP routing ID, the egress link at the first BS, or the egress backhaul RLC channel at the first BS; a routing configuration along a BAP route between a BAP routing ID and the egress link at the first BS; or a backhaul RLC channel mapping configuration between an ingress backhaul RLC channel and an egress backhaul RLC channel at the first BS.

In aspect 37, the method of aspect 35 or 36 further includes that the topology identifier is a BS CU identifier of the second BS.

In aspect 38, the method of any of aspects 35 or 36 further includes that the topology identifier is at least one of part of a BAP routing ID, a part of a backhaul RLC channel ID, or a part of a BAP address.

In aspect 39, the method of any of aspects 35-38 further includes sending, to the first BS, information indicating the topology identifier for a traffic type.

In aspect 39, the method of any of aspects 35-38 further includes that the plurality of topologies includes a first topology and a second topology that overlaps at least in part with the first topology, where the first topology carries traffic associated with the second BS and the second topology carries traffic associated with a third BS.

Aspect 41 is an apparatus for wireless communication of a second BS, comprising: means for determining a BAP configuration associated with a backhaul traffic transport, the BAP configuration including a topology identifier corresponding to a topology of a plurality of topologies for which traffic associated with the topology is transported based on the BAP configuration; and means for sending, to a first BS, the BAP configuration associated with the backhaul traffic transport.

In aspect 42, the apparatus of aspect 41 further includes means to perform the method of any of claims 36-40.

Aspect 43 is an apparatus for wireless communication of a second BS, comprising: a memory; and at least one processor coupled to the memory and configured to: determine a BAP configuration associated with a backhaul traffic transport, the BAP configuration including a topology identifier corresponding to a topology of a plurality of topologies for which traffic associated with the topology is transported based on the BAP configuration; and send, to a first BS, the BAP configuration associated with the backhaul traffic transport.

In aspect 44, the apparatus of aspect 43 further includes that the at least one processor is further configured to perform the method of any of claims 36-40.

Aspect 45 is a computer-readable medium storing computer executable code for wireless communication of a second BS, the code when executed by a processor causes the processor to: determine a BAP configuration associated with a backhaul traffic transport, the BAP configuration including a topology identifier corresponding to a topology of a plurality of topologies for which traffic associated with the topology is transported based on the BAP configuration; and send, to a first BS, the BAP configuration associated with the backhaul traffic transport.

In aspect 46, the computer-readable medium of aspect 45 further includes code to perform the method of any of claims 36-40.

Aspect 47 is a method of wireless communication at a first network node including receiving a first BAP configuration associated with a first topology, and a second BAP configuration associated with a second topology that overlaps at least in part with the first topology; and routing traffic associated with the first topology based on the first BAP configuration, and traffic associated with the second topology based on the second BAP configuration.

In aspect 48, the method of aspect 47 further includes that the first BAP configuration is associated with a first topology ID for the first topology, and the second BAP configuration is associated with a second topology ID for the second topology.

In aspect 49, the method of aspect 48 further includes determining whether traffic is associated with the first topology ID or the second topology ID in order to route the traffic.

In aspect 50, the method of any of aspects 47-49 further includes that each of the first BAP configuration and the second BAP configuration comprises, for the corresponding first topology and the second topology, respectively, at least one of: a BAP address configuration for the first network node; a setup of a backhaul RLC channel at the first network node; an uplink mapping configuration between at least one of a traffic type or IP header field and a BAP routing ID, an egress link at the first network node, or egress backhaul RLC channel at the first network node; a routing configuration along a BAP route between a BAP routing ID and the egress link at the first network node; or a backhaul RLC channel mapping configuration between an ingress backhaul RLC channel and the egress backhaul RLC channel at the first network node.

In aspect 51, the method of any of aspects 47-50 further includes that the first traffic associated with the first topology is associated with a second network node and second traffic associated with the second topology is associated with a third network node.

In aspect 52, the method of any of aspects 47-51 further includes receiving information indicating that at least one of the first topology or the second topology is associated with a particular traffic type, wherein the traffic is routed based on the received information, a traffic type being at least one of F1-C signaling, F1-U tunnel, or non-F1 traffic.

In aspect 53, the method of any of aspects 47-51 further includes that the traffic is associated with the first topology or the second topology based on a default for a traffic type of the traffic, the traffic type being at least one of F1-C signaling, F1-U tunnel, or non-F1 traffic.

In aspect 54, the method of aspect 53 further includes that the traffic is associated with the first topology by default if the traffic is communicated with a second network node, and is associated with the second topology by default if the traffic is communicated with a third network node.

In aspect 55, the method of any of aspects 47-54 further includes receiving a downstream packet associated with the first topology, and routing the traffic further includes passing the downstream packet to upper layer processing when the downstream packet carries a destination BAP address that matches a BAP address allocated to the first network node via a BAP address configuration in the first BAP configuration with the first topology.

In aspect 56, the method of any of aspects 47-54 further includes receiving a downstream packet associated with the first topology; and routing the traffic further includes forwarding the downstream packet to an egress link based on a BAP routing ID carried by the downstream packet and a routing configuration received in the first BAP configuration with the first topology when a destination BAP address carried by the downstream packet mismatches a BAP address allocated to the first network node via a BAP address configuration in a third BAP configuration with the first topology.

In aspect 57, the method of aspect 56 further includes that routing the traffic includes mapping the downstream packet associated with the first topology to an egress backhaul RLC channel on the egress link based on an ingress backhaul RLC channel on which the downstream packet is received by the first network node and based on a backhaul RLC channel mapping received in a fourth BAP configuration with the first topology.

In aspect 58, the method of any of aspects 47-57 further includes receiving an upstream packet associated with the first topology; and routing the traffic further includes forwarding the upstream packet to an egress link based on a BAP routing ID carried by the upstream packet and a routing configuration received in the first BAP configuration associated with the first topology.

In aspect 59, the method of aspect 58 further includes that routing the traffic includes mapping the upstream packet associated with the first topology to an egress backhaul RLC channel on the egress link based on an ingress backhaul RLC channel on which the upstream packet is received by the first network node and based on a backhaul RLC channel mapping received in a third BAP configuration with the first topology.

In aspect 60, the method of any of aspects 47-59 at least one of the first BAP configuration or the second BAP configuration is comprised in at least one of RRC signal or F1-C signaling.

In aspect 61, the method of any of aspects 47-54 or 60 further includes receiving a BAP SDU associated with the first topology; and routing the traffic includes sending a corresponding packet that carries a BAP routing ID based on a traffic type of the BAP SDU or IP header fields and based on an uplink mapping configuration received in the first BAP configuration with the first topology, wherein the corresponding packet for transmission on an egress link based on the BAP routing ID and a routing configuration in a third BAP configuration with the first topology, and wherein the corresponding packet maps to an egress backhaul RLC channel on the egress link based on the traffic type or the IP header fields and based on the uplink mapping configuration received in a fourth BAP configuration with the first topology.

In aspect 62, the method of any of aspects 47-54 or 60 further includes receiving a BAP SDU associated with the first topology; and routing the traffic includes sending a corresponding packet that carries a BAP routing ID based on IP header fields and a downlink mapping configuration received in the first BAP configuration with the first topology, wherein the corresponding packet is for transmission on an egress link based on the BAP routing ID and a routing configuration in a third BAP configuration with the first topology, and wherein the corresponding packet maps to an egress backhaul RLC channel on the egress link based on the IP header fields and based on the downlink mapping configuration in a fourth BAP configuration with the first topology.

In aspect 63, the method of any of aspects 47-54 or 60 further includes receiving an upstream packet associated with the first topology; and routing the traffic includes passing the upstream packet to upper layer processing when the packet carries a destination BAP address that matches a BAP address allocated to the first network node via a BAP address configuration in the first BAP configuration with the first topology.

In aspect 64, the method of any of aspects 47-51 or 56-63 further includes that the first topology is based on a network node CU identifier of a second network node and the second topology is based on a network node CU identifier of a third network node.

In aspect 65, the method of any of aspects 47-50, 51-55, or 64 further includes that each of the first BAP configuration and the second BAP configuration comprises, for the corresponding first topology and the second topology, respectively, at least one of: a modification of a backhaul RLC channel at the first network node; or a downlink mapping configuration between an IP header field and the BAP routing ID, an egress link at the first network node, or the egress backhaul RLC channel at the first network node.

In aspect 66, the method of any of aspects 47-51, 56-63, or 65 further includes that each of a first topology ID and a second topology ID is based on at least a portion of at least one of a BAP routing ID, a backhaul RLC channel ID, or a BAP address.

In aspect 67, the method of any of aspects 1-66 further includes that routing the traffic includes transmitting a packet within information indicating whether the packet is associated with the first topology ID or the second topology ID.

In aspect 68, the method of any of aspects 1-67 further includes configuring a first backhaul RLC channel based on the first BAP configuration with a first topology ID; allocating a first LCID corresponding to the first backhaul RLC channel; and communicating a packet that includes the first LCID corresponding to the first backhaul RLC channel, the communicating the packet comprising processing the packet as the traffic associated with the first topology corresponding to the first topology ID, wherein at least a portion of the first LCID is allocated to include the first topology ID.

In aspect 69, the method of any of aspects 1-67 further includes configuring a first backhaul RLC channel based on the first BAP configuration with a first topology ID; receiving a first LCID allocated for the first backhaul RLC channel; and communicating a packet that includes the first LCID corresponding to the first backhaul RLC channel, the communicating the packet comprising processing the packet as traffic associated with the first topology corresponding to the first topology ID.

Aspect 70 is an apparatus for wireless communication that includes means to perform the method of any of aspects 47-60.

In aspect 71, the apparatus of aspect 70 further includes a transceiver.

In aspect 72, the apparatus of aspect 70 further includes at least one antenna.

Aspect 73 is an apparatus for wireless communication, comprising: a memory; and at least one processor coupled to the memory, the at least one processor configured to perform the method of any of aspects 47-60.

In aspect 74, the apparatus of aspect 73 further includes a transceiver.

In aspect 75, the apparatus of aspect 73 further includes at least one antenna.

Aspect 76 is a computer-readable medium (e.g., non-transitory computer-readable medium) storing computer executable code for wireless communication of a first B S, the code when executed by a processor causes the processor to perform the method of any of aspects 47-60.

What is claimed is:

1. An apparatus for wireless communication at a first network node, comprising:
   memory; and
   at least one processor coupled to the memory and configured to:
      receive a first backhaul adaptation protocol (BAP) configuration associated with a first topology, and a second BAP configuration associated with a second topology that overlaps at least in part with the first topology, wherein the first BAP configuration is associated with a first topology identifier (ID) for the first topology and includes a first BAP address configured for the first network node, and the second BAP configuration is associated with a second topology ID for the second topology and includes a second BAP address configured for the first network node; and
      route traffic associated with the first topology based on the first BAP configuration, and traffic associated with the second topology based on the second BAP configuration.

2. The apparatus of claim 1, wherein the at least one processor is further configured to:
   determine whether the traffic is associated with the first topology ID or the second topology ID in order to route the traffic.

3. The apparatus of claim 1, wherein each of the first BAP configuration and the second BAP configuration comprises, for the first topology and the second topology, respectively, at least one of:
   a setup of a backhaul radio link control (RLC) channel at the first network node;
   an uplink mapping configuration between at least one of a traffic type or Internet protocol (IP) header field and a BAP routing identifier (ID), an egress link at the first network node, or egress backhaul RLC channel at the first network node;
   a routing configuration along a BAP route between a BAP routing ID and the egress link at the first network node; or
   a backhaul RLC channel mapping configuration between an ingress backhaul RLC channel and the egress backhaul RLC channel at the first network node.

4. The apparatus of claim 1, wherein first traffic associated with the first topology is associated with a second network node and second traffic associated with the second topology is associated with a third network node.

5. The apparatus of claim 1, wherein the at least one processor is further configured to:
   receive information indicating that at least one of the first topology or the second topology is associated with a particular traffic type, wherein the traffic is routed based on the information, a traffic type being at least one of F1 control plane (F1-C) signaling, F1 user plane (F1-U) tunnel, or non-F1 traffic.

6. The apparatus of claim 1, where the traffic is associated with the first topology or the second topology based on a default for a traffic type of the traffic, the traffic type being at least one of F1 control plane (F1-C) signaling, F1 user plane (F1-U) tunnel, or non-F1 traffic.

7. The apparatus of claim 6, wherein the traffic is associated with the first topology by default if the traffic is communicated with a second network node, and is associated with the second topology by default if the traffic is communicated with a third network node.

8. The apparatus of claim 1, wherein to route the traffic, the at least one processor is further configured to:
   receive a downstream packet associated with the first topology; and
   pass the downstream packet to upper layer processing when the downstream packet carries a destination BAP address that matches a BAP address allocated to the first network node via a BAP address configuration in the first BAP configuration with the first topology.

9. The apparatus of claim 1, wherein to route the traffic, the at least one processor is further configured to:
   receive a downstream packet associated with the first topology; and
   forward the downstream packet to an egress link based on a BAP routing ID carried by the downstream packet and a routing configuration received in the first BAP configuration with the first topology when a destination BAP address carried by the downstream packet mismatches a BAP address allocated to the first network node via a BAP address configuration in a third BAP configuration with the first topology.

10. The apparatus of claim 9, wherein to route the traffic, the at least one processor is further configured to:
map the downstream packet associated with the first topology to an egress backhaul radio link control (RLC) channel on the egress link based on an ingress backhaul RLC channel on which the downstream packet is received by the first network node and based on a backhaul RLC channel mapping received in a fourth BAP configuration with the first topology.

11. The apparatus of claim 1, wherein to route the traffic, the at least one processor is further configured to:
receive an upstream packet associated with the first topology; and
forward the upstream packet to an egress link based on a BAP routing identifier (ID) carried by the upstream packet and a routing configuration received in the first BAP configuration associated with the first topology.

12. The apparatus of claim 11, wherein to route the traffic, the at least one processor is further configured to:
map the upstream packet associated with the first topology to an egress backhaul radio link control (RLC) channel on the egress link based on an ingress backhaul RLC channel on which the upstream packet is received by the first network node and based on a backhaul RLC channel mapping received in a third BAP configuration with the first topology.

13. The apparatus of claim 1, wherein at least one of the first BAP configuration or the second BAP configuration is comprised in at least one of radio resource control (RRC) signal or F1 control plane (F1-C) signaling.

14. The apparatus of claim 1, wherein to route the traffic, the at least one processor is further configured to:
receive a BAP service data unit (SDU) associated with the first topology; and
send a corresponding packet that carries a BAP routing ID based on a traffic type of the BAP SDU or an Internet protocol (IP) header field and based on an uplink mapping configuration received in the first BAP configuration with the first topology, wherein the corresponding packet for transmission on an egress link based on the BAP routing ID and a routing configuration in a third BAP configuration with the first topology, and wherein the corresponding packet maps to an egress backhaul radio link control (RLC) channel on the egress link based on the traffic type or the IP header field and based on the uplink mapping configuration received in a fourth BAP configuration with the first topology.

15. The apparatus of claim 1, wherein to route the traffic, the at least one processor is further configured to:
receive a BAP service data unit (SDU) associated with the first topology; and
send a corresponding packet that carries a BAP routing ID based on Internet protocol (IP) header fields and a downlink mapping configuration received in the first BAP configuration with the first topology, wherein the corresponding packet is for transmission on an egress link based on the BAP routing ID and a routing configuration in a third BAP configuration with the first topology, and wherein the corresponding packet maps to an egress backhaul radio link control (RLC) channel on the egress link based on the IP header fields and based on the downlink mapping configuration in a fourth BAP configuration with the first topology.

16. The apparatus of claim 1, wherein to route the traffic, the at least one processor is further configured to:
receive an upstream packet associated with the first topology; and
pass the upstream packet to upper layer processing when the upstream packet carries a destination BAP address that matches a BAP address allocated to the first network node via a BAP address configuration in the first BAP configuration with the first topology.

17. The apparatus of claim 1, wherein the first topology is based on a network node central unit (CU) identifier of a second network node and the second topology is based on a network node CU identifier of a third network node.

18. The apparatus of claim 1, wherein each of the first BAP configuration and the second BAP configuration comprises, for the first topology and the second topology, respectively, at least one of:
a modification of a backhaul radio link control (RLC) channel at the first network node; or
a downlink mapping configuration between an internet protocol (IP) header field and a BAP routing identifier (ID), an egress link at the first network node, or the egress backhaul RLC channel at the first network node.

19. The apparatus of claim 1, wherein each of the first topology ID and the second topology ID is based on at least a portion of at least one of a BAP routing ID, a backhaul radio link control (RLC) channel ID, or a BAP address.

20. The apparatus of claim 1, wherein to route the traffic associated with the first topology based on the first BAP configuration, and the traffic associated with the second topology based on the second BAP configuration, the at least one processor is configured to transmit a packet within information indicating whether the packet is associated with the first topology ID or the second topology ID.

21. The apparatus of claim 1, wherein the at least one processor is further configured to:
configure a first backhaul radio link control (RLC) channel based on the first BAP configuration with the first topology ID;
allocate a first logical channel ID (LCID) corresponding to the first backhaul RLC channel; and
communicate a packet that includes the first LCID corresponding to the first backhaul RLC channel, the communicating the packet comprising processing the packet as the traffic associated with the first topology corresponding to the first topology ID, wherein at least a portion of the first LCID is allocated to include the first topology ID.

22. The apparatus of claim 1, wherein the at least one processor is further configured to:
configure a first backhaul radio link control (RLC) channel based on the first BAP configuration with the first topology ID;
receive a first logical channel ID (LCID) allocated for the first backhaul RLC channel; and
communicate a packet that includes the first LCID corresponding to the first backhaul RLC channel, the communicating the packet comprising processing the packet as the traffic associated with the first topology corresponding to the first topology ID.

23. The apparatus of claim 1, wherein the first BAP configuration is received from a first donor central unit (CU), and the second BAP configuration is received from a second donor CU, wherein the first network node is dual-connected to the first donor CU and the second donor CU.

24. The apparatus of claim 23, wherein the at least one processor is further configured to:
- receive, from the first donor CU, a first setup of a first backhaul radio link control (RLC) channel associated with the first topology; and
- receive, from the second donor CU, a second setup of a second backhaul RLC channel associated with the second topology.

25. A method of wireless communication of a first network node, comprising:
- receiving a first backhaul adaptation protocol (BAP) configuration associated with a first topology and a second BAP configuration associated with a second topology that overlaps at least in part with the first topology, wherein the first BAP configuration is associated with a first topology identifier (ID) for the first topology and includes a first BAP address configured for the first network node, and the second BAP configuration is associated with a second topology ID for the second topology and includes a second BAP address configured for the first network node; and
- routing first traffic associated with the first topology based on the first BAP configuration, and second traffic associated with the second topology based on the second BAP configuration.

26. An apparatus for wireless communication at a second network node, comprising:
- memory; and
- at least one processor coupled to the memory and configured to:
  - send, to a first network node, a backhaul adaptation protocol (BAP) configuration associated with a backhaul traffic transport, the BAP configuration including a topology identifier corresponding to a topology of a plurality of topologies for which traffic associated with the topology is transported based on the BAP configuration, wherein the BAP configuration includes a BAP address for the first network node for the topology; and
  - communicate with the first network node based on the BAP configuration.

27. The apparatus of claim 26, wherein the BAP configuration comprises, for the topology, at least one of:
- a BAP address configuration for the first network node;
- a setup of a backhaul radio link control (RLC) channel at the first network node;
- a modification of the backhaul RLC channel at the first network node;
- an uplink mapping configuration between at least one of a traffic type or Internet protocol (IP) header field and a BAP routing identifier (ID), an egress link at the first network node, or egress backhaul RLC channel at the first network node;
- a downlink mapping configuration between the IP header field and the BAP routing ID, the egress link at the first network node, or the egress backhaul RLC channel at the first network node;
- a routing configuration along a BAP route between a BAP routing ID and the egress link at the first network node; or
- a backhaul RLC channel mapping configuration between an ingress backhaul RLC channel and the egress backhaul RLC channel at the first network node.

28. The apparatus of claim 26, wherein the topology identifier is a network node central unit (CU) identifier of the second network node, and wherein the plurality of topologies includes a first topology and a second topology that overlaps at least in part with the first topology, where the first topology carries first traffic associated with the second network node and the second topology carries second traffic associated with a third network node.

29. The apparatus of claim 26, wherein the topology identifier is based on a part of at least one of a BAP routing identifier (ID), a backhaul radio link control (RLC) channel ID, or the BAP address.

30. The apparatus of claim 26, wherein the at least one processor is further configured to:
- send, to the first network node, information indicating the topology identifier for a traffic type.

31. A method of wireless communication of a second network node, comprising:
- sending, to a first network node, a backhaul adaptation protocol (BAP) configuration associated with a backhaul traffic transport, the BAP configuration including a topology identifier corresponding to a topology of a plurality of topologies for which traffic associated with the topology is transported based on the BAP configuration, wherein the BAP configuration includes a BAP address for the first network node for the topology; and
- communicating with the first network node based on the BAP configuration.

* * * * *